US011255972B2

(12) United States Patent
Kalscheur et al.

(10) Patent No.: US 11,255,972 B2
(45) Date of Patent: *Feb. 22, 2022

(54) ACTUATED OPTICAL ELEMENT FOR LIGHT BEAM SCANNING DEVICE

(71) Applicant: Apple Inc., Cupertino, CA (US)

(72) Inventors: Micah P. Kalscheur, San Francisco, CA (US); Jawad Nawasra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 16/147,500

(22) Filed: Sep. 28, 2018

(65) Prior Publication Data
US 2019/0041521 A1    Feb. 7, 2019

Related U.S. Application Data

(63) Continuation of application No. 14/628,054, filed on Feb. 20, 2015, now Pat. No. 10,107,914.

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4814* (2013.01); *G01S 7/4817* (2013.01); *G01S 17/10* (2013.01); *G01S 17/42* (2013.01); *G01S 7/51* (2013.01)

(58) Field of Classification Search
CPC ...... G01S 7/4814; G01S 7/4817; G01S 17/89; G01S 17/10; G01S 17/42; G01S 17/023; G01S 17/894
See application file for complete search history.

(56) References Cited

U.S. PATENT DOCUMENTS 5,638,164 A * 6/1997 Landau ................. G01S 7/4802
356/5.01
6,420,698 B1 * 7/2002 Dimsdale .............. G01S 7/4811
250/205
(Continued)

OTHER PUBLICATIONS

U.S. Appl. No. 14/628,042, filed Feb. 20, 2015, Micah P. Kalscheur, et al.
(Continued)

*Primary Examiner* — Luke D Ratcliffe
(74) *Attorney, Agent, or Firm* — Robert C. Kowert; Kowert, Hood, Munyon, Rankin & Goetzel, P.C.

(57) ABSTRACT

A light beam scanning device includes a lens element assembly which dynamically adjusts a divergence of the beam. The lens element assembly can include multiple lens elements, one or more of which translates parallel to the light beam to adjust beam divergence. Divergence adjustment can include adjusting the beam divergence along one or more cross sectional axes of the beam. Beam divergence can be adjusted between consecutive scans, during a scan, etc. Beam divergence can be adjusted based on the field of view and scan rate. Beam divergence adjustment can enable dynamic adjustment of the spot size of the beam, which can enable the apparatus to adjust between scanning a wide divergence beam to detect objects in a scene and scanning a narrow divergence beam to generate detailed point clouds of the detected objects. Beam divergence adjustment can enable adjustment of reflection point intensity, enabling detection of low-reflectivity objects.

20 Claims, 8 Drawing Sheets

(51) Int. Cl.
    *G01S 17/42*     (2006.01)
    *G01S 17/10*     (2020.01)
    *G01S 7/51*     (2006.01)

(56) References Cited

U.S. PATENT DOCUMENTS

| | | |
|---|---|---|
| 7,064,810 B2 | 6/2006 | Anderson et al. |
| 7,187,452 B2 | 3/2007 | Jupp et al. |
| 8,213,022 B1 | 7/2012 | Riza et al. |
| 10,107,914 B2 | 10/2018 | Kalscheur et al. |
| 2003/0123045 A1 | 7/2003 | Riegl et al. |
| 2004/0130702 A1* | 7/2004 | Jupp ............... G01S 17/89 356/5.01 |
| 2005/0057741 A1* | 3/2005 | Anderson ......... G01S 17/89 356/5.01 |
| 2006/0176468 A1 | 8/2006 | Anderson et al. |
| 2013/0054187 A1 | 2/2013 | Pochiraju et al. |
| 2013/0207970 A1 | 8/2013 | Shpunt et al. |
| 2013/0242363 A1 | 9/2013 | Weiss et al. |
| 2013/0293681 A1 | 11/2013 | Borowski |

OTHER PUBLICATIONS

U.S. Appl. No. 13/798,251, filed Mar. 13, 2013, Naftali Chayat, et al.
International Search Report and Written Opinion from PCT/US2016/018790, dated Jun. 15, 2016, Apple Inc., pp. 1-14.

* cited by examiner

ACTUATED OPTICAL ELEMENT FOR LIGHT BEAM SCANNING DEVICE

This application is a continuation of U.S. patent application Ser. No. 14/628,054, filed Feb. 20, 2015, which is hereby incorporated by reference herein in its entirety.

BACKGROUND

Technical Field

This disclosure relates generally to light beam scanning and, more particularly, to providing images, mapping, etc. of scenes via light beam scanning.

Description of the Related Art

Beam scanning, also referred to herein as light beam scanning, includes directing a light beam at an object and determining a distance to the object based on a "time of flight" between an emitter of the light beam and a detector of the reflected light beam. The emitter and detector can be included in a common device.

Light beam scanning can be used to generate an image, 3D map, etc. of one or more portions of a scene, including one or more objects in the scene, by scanning a pulsed light beam over the scene and determining a flight time of the light beam pulses between the device and various parts of the scene. As used herein, generating an image, 3D map, etc. of one or more portions of a scene includes "image mapping" of the one or more portions of the scene. In some cases, a 3D map of an object, scene, etc. includes a 3D "point cloud" of multiple individual points of reflection of light beam pulses off of various surfaces on one or more objects located in a scene. A light beam scanning device can, in some cases, emit a pulsed light beam which is "scanned" over a field of view of the device by a "scanner". The device can detect and process the various reflected light beam pulses which are reflected from various surfaces located within the field of view and received at a detector to determine the position, within the field of view, of each of the various points on the object from which the light beam pulses were reflected.

SUMMARY OF EMBODIMENTS

Some embodiments provide an apparatus which includes a light beam scanning device which scans a light beam, within a scan range, over a scene that is within a field of view of the scan range and generates an image map of at least a portion of the scene, based at least in part upon a time of flight of the light beam to and from one or more points within the scene. The light beam scanning device can include a lens element assembly which dynamically adjusts a divergence of the light beam. In some embodiments, the lens element assembly can include multiple lens elements, and one or more of the lens elements can be translated, relative to at least one other of the lens elements and in a direction parallel to a direction of the light beam, to implement dynamic divergence adjustment. In some embodiments, dynamically adjusting a divergence of the light beam can include adjusting a diameter of the light beam along one or more axes of the light beam. In some embodiments, the apparatus can include a scanner which scans the light beam, received from the lens element assembly, over a selected field of view of the scan range at one or more scan rates. In some embodiments, the apparatus can include a controller device which controls the lens element assembly to dynamically adjust the divergence of the light beam as the light beam is scanned over the selected field of view. In some embodiments, the controller device can adjust the light beam divergence between separate scans of the light beam over at least a portion of the selected field of view, such that the divergence of the light beam is different between at least two consecutive scans. In some embodiments, the controller device can adjust the light beam divergence during a scan over at least a portion of the selected field of view. In some embodiments, the controller device controls the lens element assembly and the scanner to initially scan the light beam over a first selected field of view of the scan range at a first scan rate and a first divergence, and subsequently scan the light beam over a second field of view, encompassed within a limited region of the first field of view, at a second scan rate and a second divergence, based at least in part upon a determined time of flight of the light beam to and from at least a point located within the second field of view. In some embodiments, to generate the image map of at least a portion of the scene, the light beam scanning device can determine at least a depth, azimuth, and elevation of the portion of the scene, relative to at least a portion of the light beam scanning device, based at least in part upon the time of flight of the light beam to and from the point, and an orientation of the scanner. The light beam scanning device can include a detector which receives the light reflected from at least a point within the field of view. The detector can include a single-pixel sensor receives the light reflected from at least a point within the field of view at a single sensor element. The light beam scanning device can include a light detection and ranging (LIDAR) device.

Some embodiments provide a method which includes dynamically adjusting a divergence of a light beam scanned, by a scanner, over a scene that is within a field of view of a scan range, such that a map of at least a portion of the scene is generated, based at least in part upon a time of flight of the light beam to and from one or more points within the scene. In some embodiments, dynamic adjustment includes directing the beam of light to be scanned, by the scanner, over a first field of view at a first scan rate and at a first divergence and, based at least in part upon a time of flight of the light beam to and from a particular portion of the scene within the first field of view, directing the beam of light to be scanned, by the scanner, over a second field of view at a second scan rate and at a second divergence, wherein the second field of view encompasses a limited region of the first field of view which includes the particular portion of the scene. In some embodiments, directing the beam of light to be scanned, by the scanner, over a second field of view at a second scan rate and at a second divergence includes selecting the second scan rate and the second divergence based at least in part upon the time of flight of the light beam to and from the particular portion of the scene within the first field of view. In some embodiments, dynamically adjusting the divergence of the light beam comprises adjusting a divergence of at least one axis of the light beam, relative to a divergence of at least one other axis of the light beam. In some embodiments, adjusting the divergence of the light beam comprises adjusting the divergence of at least one axis of the light beam to equal the divergence of at least one other axis of the light beam.

Some embodiments provide a method which includes configuring a light beam scanning device to scan a light beam having a dynamically-adjustable divergence, within a scan range, over a scene that is within a field of view of the scan range and generate a map of at least a portion of the scene, based at least in part upon a time of flight of the light beam to and from one or more points within the scene. Such configuring includes coupling a lens element assembly to at least a portion of the light-beam scanning device, wherein the lens element assembly is configured to adjust the divergence of the light beam. In some embodiments, providing the lens element assembly in a light-beam scanning device includes coupling the lens element assembly to a location along a pathway of the light beam between a transmitter configured to emit the light beam and a scanner configured to scan the light beam over the field of view of the scan range. In some embodiments, the lens element assembly comprises a plurality of lens elements, wherein at least one of the lens elements is configured to be adjusted along a directional axis which is parallel to a pathway of the light beam and relative to at least one other of the lens elements to adjust the divergence of the light beam. In some embodiments, the configuring includes coupling the lens element assembly to a controller device configured to adjust the at least one of the lens elements based at least in part upon a time of flight of the light beam to and from one or more points within the scene. In some embodiments, the configuring comprises coupling a detector to the light beam scanning device, wherein the detector is configured to receive the light reflected from at least a point within the field of view and generate an output indicating at least the time of flight of the light beam to and from the point, such that the light beam device is configured to: determine at least a depth, azimuth, and elevation of the one or more points within the, relative to at least a portion of the light beam scanning device based at least in part upon the output generated by the detector and an orientation of the scanner; and adjust the divergence of the light beam based at least in part upon the depth, azimuth, and elevation of the one or more points within the scene.

Figure 1:
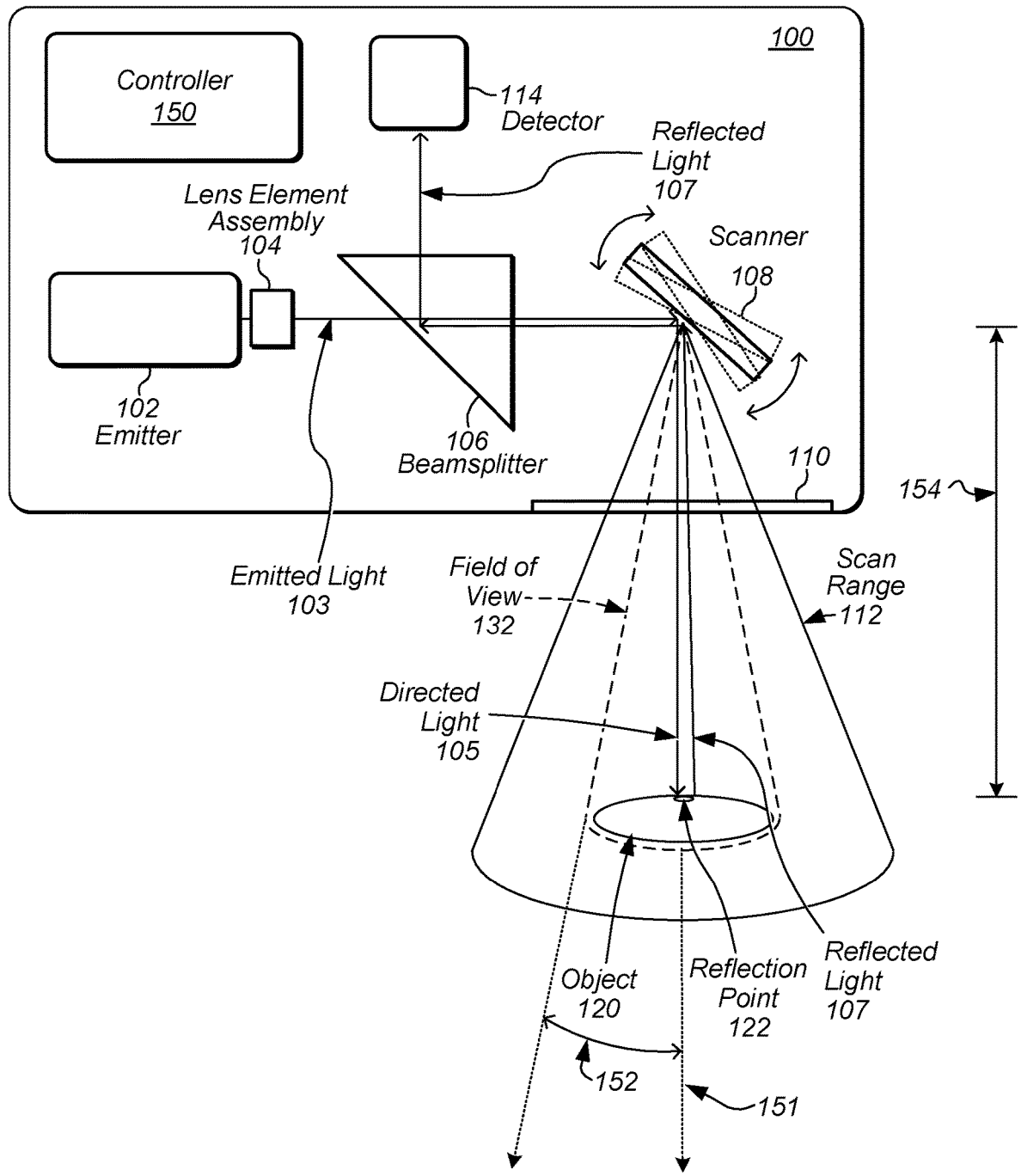
FIG. 1 illustrates a light beam scanning device which scans light beams over a field of view, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide an apparatus which includes a light beam scanning device which can be used to generate image maps of various objects and scenes within a scan range of the device, where the device is configured to at least partially adjust the divergence of a light beam, such that a cross sectional area of the beam, also referred to herein as a "beam spot", is adjusted along the distance travelled by the beam. Adjusting the beam spot size can include adjusting the beam divergence such that the beam spot of the beam at a given distance from the emitter is adjusted in one or more of size, shape, some combination thereof, etc. As referred to herein, the size of the cross sectional area of a beam can be referred to as the beam spot size of the beam. As a result, as referred to herein, beam divergence adjustment can be referred to interchangeably as beam spot size adjustment. Adjustment of the beam spot size of a light beam which is scanned over at least some portion of a scan range can enable the apparatus to adjust the scanned beam between a wide-divergence beam, which can be scanned over a field of view to detect objects in the field of view, and a narrow-divergence beam, which can be scanned over a limited region of the field of view in which the detected objects are located to generate a detailed point cloud of the detected objects. A narrow-divergence beam includes a relatively smaller beam spot size of the beam at a given distance of travel, relative to a wide-divergence beam, such that the beam spot size of a wide-divergence beam is relatively larger, at a given distance of beam travel, than that of a narrow-divergence beam. In some embodiments, the apparatus can initially scan a field of view via a wide-divergence beam, to initially detect objects within the field of view, and subsequently scan limited regions of the field of view, in which the detected objects are located, via a narrow-divergence beam. Beam divergence adjustment can enable adjustment of the intensity of the reflection point, enabling detection of objects with relatively low reflectivity.

An image map can include a two-dimensional (2D) image of a scene, a three-dimensional (3D) image mapping of a scene, some combination thereof, or the like. The device can direct a light beam, can include a sequence of light beam pulses (referred to herein as a "pulsed light beam"), out from the device into a field of view of the device. The light beam can travel out from the device and into the field of view, where the beam can be reflected off of one or more points (herein "reflection points") on various surfaces within the field of view and travel back, as a reflected beam to a detector included in the device. The detector can receive the reflected light beam, detect the reflected beam, and generate an output associated with the detection. Detection of a reflected beam which is reflected off of a reflection point in the field of view can comprise detection of the reflection point itself. Such an output can include a determined time that the reflected beam is detected, an intensity of the detected reflected beam, a travel time (also referred to herein as "flight time", "time of flight", etc.) of the light beam to between the device and the reflection point, a position of the reflection point within the field of view of the device, some combination thereof, etc. The position of the reflection point within the field of view can include a determined range (also referred to herein as "depth", "distance", etc.) of the reflection point from the device, which can be determined based on the flight time of the beam between the device and the reflection point. In addition, the position of the reflection point can include an angular position of the reflection point within the field of view. Such an angular position can be expressed as an azimuth (horizontal angle from the center of the device field of view) and an elevation (vertical angle from the center of the device field of view).

As referred to herein, a "light beam" includes a laser beam which can be emitted by a laser light source. The laser beam can be collimated and directed in one or more particular directions. In some embodiments, the light beam scanning device includes one or more light collimating elements, which can be included in one or more lens elements, which controllably adjust a spatial mode of the light beam. As a result, the collimated light beam, which can be a collimated laser beam, can exhibit coherence along the collimation range.

In some embodiments, one or more position properties (depth, azimuth, elevation, etc.) of reflection points detected in a field of view can be determined based at least in part upon properties of elements of the light beam scanning devices other than the detector. For example, the azimuth and elevation of the reflection point detected at detector can be determined based at least in part upon the azimuth and elevation to which a scanner device in the light beam scanning device is positioned to direct light beam pulses concurrently with at least a portion of the time during which the light beam travels between the device and the reflection point. In some embodiments, reflected beam intensity is included in the generated output as a property of the reflection point. In some embodiments, reflection point depth is determined based at least in part upon one or more of reflection point intensity, reflection point size, reflection point shape, etc. For example, where a reflection point is determined, based on detection of a reflected light beam from the reflection point, to have a relatively large surface area and low intensity, the reflection point can be determined to have a relatively large depth within the field of view. It will be understood that the position of the reflection point can include various position properties of the reflection point, including coordinates of the reflection point within the field of view.

Where the light beam is a sequence of pulses, the device can direct the pulses to travel in different directions (e.g., different azimuths and elevations relative to a center of the field of view) from the device within the field of view. The device can include a scanner device, also referred to herein as a "scanner", which can direct different light beam pulses to travel in different directions within the field of view. In some embodiments, the scanner directs light beam pulses to travel in different directions within a field of view which is smaller than, and included within, the maximum field of view of the device. Such a maximum field of view can be based on physical limitations of the scanner and can be referred to as the "scan range" of the scanner, the "scan range" of the device, etc. The scanner, in some embodiments, includes a reflective device, including a mirror, which can be adjusted, based at least in part upon an action of an actuator device associated with the scanner, to different orientations to cause the light beam pulses received from an emitter device to be reflected into different directions of travel, thereby directing the beam pulses into different directions within the field of view. As a result, the light beam pulses can be directed to travel into different regions of the field of view, reflect off of different points on various surfaces in the field of view, and return to the detector in the device. In some embodiments, the reflected beams received at the device are directed to the reflector by at least the scanner. Based on the pulses which are directed into different regions of the field of view, and are reflected off of various reflection points in those various regions, the device can detect reflection points, and positions thereof, in various different regions of the field of view. In some embodiments, the light beam scanning device can monitor various properties of various detected reflection points (e.g., depth, azimuth, elevation, intensity, some combination thereof, etc.) and, based on similarities in one or more properties between various reflection points, correlate the various reflection points to one another to generate a point "cloud" of reflection points which represent a point cloud of an object located within the field of view. The generated point cloud can be used to generate a 3D map of the object, an image of the object, track the object in the field of view, etc.

In some cases, a light beam cross section, also referred to herein as the "beam spot" changes with distance from the emitter of the beam. For example, a light beam cross-sectional area can grow with distance traveled. Such growth can be due to a divergence of the beam. As used herein, divergence of the light beam refers to an angular measure of the increase of one or more dimensional properties of the beam cross section, including one or more of beam radius, diameter, some combination thereof, etc. in one or more cross sectional axes as the beam travels away from one or more of a light beam emitter, optical aperture, optical lens, some combination thereof, etc.

While the light beam can be a laser beam, the beam can exhibit divergence along one or more axes of the beam cross section as the beam travels away from the light beam emitter, which can include one or more laser diodes. Where divergence is approximately equal in value across all cross-sectional axes, the beam cross section can grow larger with travel distance of the light beam from the emitter, with corresponding decrease in overall light beam intensity.

In addition, a light beam can have an asymmetric emission, such that the beam has a fast axis and a slow axis, where the divergence of the fast axis is greater than that of the slow axis. As a result, a cross-sectional area can change shape and size over distance travelled. For example, where an initially-emitted light beam has a circular cross-section, the light beam can become more elliptical in shape with distance travelled from the emitter, as the divergence of the fast axis of the beam can be greater than that of the slow axis of the beam. Such a deformed beam can result in inaccuracies in determining the position of reflection points in a scene. Such inaccuracies can be exacerbated with distance between the scanning device and various objects in the field of view, thereby complicating efforts to generate accurate imaging of a scene via light beam scanning of a field of view.

In some embodiments, a light beam has different divergence values across different axes of the beam cross-section. For example, where the light beam has asymmetric emission, the beam can have a fast axis which exhibits a certain value of divergence and a slow axis which exhibits a different value of divergence which is less than that of the divergence of the fast axis. As a result, as a light beam travels further from the light-beam scanning device, the shape of the beam cross section can change, in addition to size. For example, where a light beam has a slow axis and a fast axis, and where the fast axis has a greater divergence than the slow axis, the beam cross section can change shape from circular to ellipsoid with increasing travel distance, as the diameter of the beam spot along the fast axis can become progressively larger with respect to the diameter of the beam spot along the slow axis.

In some embodiments, a beam with a relatively large ("wide") beam divergence can exhibit a relatively large beam spot. Such a wide-divergence beam spot, encompassing a relatively large region of the field of view and also referred to herein as a large beam spot size, can be more likely than beam spots of narrower-divergence beams, where beam spots of narrower-divergence beams can be smaller in spot size than the beam spot of a wider-divergence beam at a common distance of beam travel, to reflect off of a surface of one or more objects located in the field of view. As a result, scanning a relatively wide-divergence beam through a field of view can be relatively more likely to result in detection of one or more reflection points, and thus objects, in the field of view. While wide-divergence beams can be more likely to result in object detection in a field of view, the resolution of a point cloud of the object generated based on detected reflection points may be less than that of a point cloud generated based on detected reflection points which result from scanning a narrower-divergence beam over the object.

In some embodiments, a beam with a relatively small ("narrow") beam divergence can exhibit a relatively small beam spot. Such a narrow-divergence beam spot, encompassing a relatively small region of the field of view, can be more likely than beam spots of wider-divergence beams to reflect off of different detailed surfaces of one or more objects located in the field of view. As a result, scanning a relatively narrow-divergence beam through a field of view can be relatively more likely to result in generating a point cloud of an object which resolves various details and features of the object in the field of view, relative to scanning a wider-divergence beam through the field of view. While narrow-divergence beams can be more likely to result in higher-resolution point clouds being generated for an object in a field of view, the likelihood of detection of an object in the field of view via a narrow-divergence beam, based at least in part upon detection of at least one reflection point on the object, may be less than the likelihood of detection of an object via a wider-divergence beam scanning.

The apparatus can include a lens element assembly which can adjust divergence of the light beam along one or more cross sectional axes of the beam.

The lens element assembly included in the light beam scanning device can control divergence of the beam along one or more cross-sectional axes. As used herein, cross sectional axis is an axis which is perpendicular to the optical axis of the light beam. Divergence control can result in improved accuracy of determining the position of reflection points in the field of the view of the device, which can result in more accurate images, 3D maps, etc. generated based on the reflection points. For example, where a light beam has variable divergence in different cross sectional axes, different beam pulses of the light beam can change to different cross sectional shapes based on the distance traveled to and from various surfaces in the field of view: pulses which reflect off of nearby surfaces may remain approximately circular in cross section, while pulses which reflect off of distance surfaces may be highly ellipsoid. Controlling beam divergence can at least partially mitigate such non-uniformity of beam pulse cross sections, which can improve the accuracy of the device in determining the properties of reflection points detected at various positions within the field of view (e.g., at various distances from the device), which can improve the correlation of various sets of reflection points into point clouds of various objects, etc. As a result, image mapping accuracy is enhanced, resulting in images, 3D maps, etc. which have improved accuracy in mapping the various objects in the scene that is within the field of view.

In some embodiments, the lens element assembly can control beam divergence, thus controlling beam spot size, along one or more cross-sectional axes to control the beam spot size of the beam, thereby adjusting the beam to optimize between object detection and high-resolution object point cloud generation. For example, the lens element assembly can control the beam divergence to cause a beam scanned over a field of view to initially have a wide divergence and a resulting large beam spot size, thereby optimizing a scan of the beam to result in detecting objects in the field of view, and subsequently to have a narrow divergence, thereby optimizing a scan of the beam to result in resolving detailed point clouds of the detected objects in the field of view. The field of view can be adjusted based on object detection via a wide-divergence beam scan, such that a narrow-divergence beam is scanned over a limited region, of the initial field of view, in which an object is initially detected via a wide-divergence beam scan.

Light Beam Scanning Device

FIG. 1 illustrates a light beam scanning device 100 which scans light beams over a field of view, according to some embodiments. Device 100 can include a light detection and rangefinding ("LIDAR") device. Device 100 includes a light emitter 102 which emits a light beam 103. The emitter 102 can emit the light beam as a sequence of beam pulses, also referred to herein as a pulsed light beam.

The emitter 102 can be a laser light source, also referred to herein interchangeably as a laser emitter, laser light emitter, etc. In some embodiments, the emitter 102 includes one or more laser diodes. In some embodiments, the light emitter 102 is a laser light source which includes a vertical cell external cavity laser (VCSEL) emitter. In some embodiments, a light beam emitted by a VCSEL emitter is independent of asymmetrical emission, such that the emitted beam does not include a fast axis, slow axis, etc. In some embodiments, the light emitter 102 includes a fiber laser emitter which emits a light beam which is a laser beam having a Gaussian beam profile, which results in the beam having a cross-sectional intensity distribution which approximates a Gaussian profile. In some embodiments, the emitter 102 includes an edge-emitting solid state laser emitter. An edge-emitting solid state laser emitter can emit a laser beam which exhibits asymmetric emission, such that the beam exhibits an elliptical cross-sectional area which includes a fast axis and a slow axis. Such a beam can, in some embodiments, be at least partially polarized. It will be understood that the light emitter as described herein can encompass any known laser light source. As referred to herein, a cross-sectional area, distribution, etc. with regard to a light beam can be referred to interchangeably as a transverse area, transverse distribution, etc.

Device 100 includes a scanner 108 which directs the light beam 103 in various directions over a field of view 112. Such directing the light beam 103, various pulses included therein, etc. over various regions of a field of view can be referred to as "sweeping" the beam over the field of view, "scanning" the beam over the field of view, etc. The scanner 108 can "scan" the beam over the field of view in one or more particular scan patterns, so that the beam, pulses therein, etc. are directed across various regions of the field of view in a particular pattern across the field of view. The scanner 108 can include a reflective device, including a mirror, which can be controllably adjusted to various orientations so that the light beam 103 is directed to travel in various controlled directions within the field of view 112. The scanner 108 can be controllably adjusted to various orientations, to direct the light beam 103 to travel in a particular direction, based on an actuator device associated with the scanner 108. In some embodiments, the field of view 112 of the device 100 can be based at least in part upon the range of directions in which the scanner 108 can direct light beams received from emitter 102.

Device 100 include an optical aperture 110 through which the light beam travels, as directed beam 105, from the scanner 108 out into an external environment 101. The field of view 112 of the device 100 can be based at least in part upon the optical aperture 110.

In some embodiments, the directed light beam 105 travels, within a particular region of the field of view 112 based at least in part upon the orientation of the scanner 108, and reaches a surface of an object 120 located within the field of view 112. The light beam 105 can reach a particular point 122 on the object, thereby illuminating the point 122. At least a portion of the beam 105 which reaches the point 122 can reflect off of the point 122 as a reflected beam 107. The reflected beam 107 can return to the device 100. As such, the point 122 can be referred to as a "reflection point". In some embodiments, the reflection point 122 has a size and shape which corresponds to the beam spot of the light beam 105 which reaches the object 120 and reflects off of point 122. For example, where light beam 105 is a wide-divergence beam with a relatively large beam spot size, the size of point 122 can be relatively larger in area than if beam 105 were a narrow-divergence beam with a relatively small beam spot size.

The device includes a detector 114 which can detect the reflection point 122 based on receiving the reflected beam 107. In the illustrated embodiment, the device 100 includes a beam splitter 106 and directs the reflected beam 107 to reach the detector via the scanner 108 and the beam splitter 106. It will be understood that, in some embodiments, the beam splitter 106 is absent and the reflected beam 107 reaches the detector 114 via a pathway which is at least partially separate from the pathway followed by the beam 103, 105 via the scanner 108. For example, the detector 114 can be located proximate to a separate optical aperture and can directly detect reflected beams 107 which reach the separate optical aperture. In some embodiments, the detector includes a single sensing element which can detect a reflected beam 107. For example, the detector 114 can be a single-pixel detector.

The detector 114 can detect the reflection point based at least in part upon detecting the reflected light beam 107 received at the detector 114. The detector can determine a travel time of the beam between at least the device 100 and the reflection point 122 and can therefore determine the position of the reflection point 122, relative to the device 100. For example, where the light beam 103, 105, 107 is an individual beam pulse, the detector can determine a travel time of the beam to reflection point 122 based on a time of emittance of the pulse at emitter 102 and a time of receiving the reflected beam pulse 107 at the detector 114. The distance traveled by beam 103 within device 100 (e.g., from emitter 102 to scanner) the distance traveled by beam 107 within device 100 (e.g., from scanner 108 to detector 114 may be predetermined, such that the travel time corresponding to such distances of travel within device 100 can be discounted from the elapsed time between beam emittance at emitter 102 and reception at detector 114 to determine the travel time of the light beam between the scanner 108, optical aperture 110, etc. and the reflection point 122.

Based on the travel time of the beam to the point 122, device 100 can determine the distance ("depth") of the reflection point within the field of view 112. In addition, based on the orientation of the scanner 108, the position of the reflection point in three dimensions within the field of view 112 can be determined. For example, in the illustrated embodiment, the position of the reflection point 122 can be determined as a particular depth 154, azimuth 152, and elevation (orthogonal to azimuth 152) relative to the position of the scanner 108, based on the travel time of the beam to and from the reflection point 122 and the orientation of the scanner concurrently with the beam travelling to and from the point 122.

In some embodiments, the device 100 generates a point "cloud" of an object 120 based on a correlation of the detected reflection points 122 on one or more surfaces of the object. Where the scanner 108 adjusts to direct beam 103 pulses to reflect off of various points 122 on the object 120 at various azimuths 154 relative to a center 151 of the field of view 112 and elevations (angular difference from 151 along an axis orthogonal to azimuth 152, i.e. in a direction out of the figure), such that the various reflection points 122 are detected by detector 114, the device 100 can correlate the various reflection points 122 on the object to generate a point "cloud" of the object 120. The correlated points 122 may be correlated based on similarities in properties, relative to other points 122 in the field of view 112. For example, a set of points 122 with similar depth 154, azimuth 152, and elevation properties may be determined to be points on one or more surfaces of a common object 120 and can be correlated into a point cloud of the object, relative to other reflection points with different properties, including different depth, azimuth, and elevation properties. In another example, a set of point 122 with similar intensity may be determined to be points on one or more surfaces of a common object 120 and can be correlated into a point cloud of the object, relative to other reflection points with different intensities.

Device 100 includes a lens element assembly 104 which adjusts divergence of the beam 103. As shown, the lens element assembly 104 can be located along an optical pathway of the light beam 103 through the device, between the emitter 102 and the optical aperture 110. As shown, the lens element assembly 104 can be located between the emitter 102 and the scanner 108, although it will be understood that the assembly 104 can be located in other locations in the device, including between the scanner 108 and the aperture 110, between the scanner and a beam splitter, etc. Multiple separate assemblies 104 can be located along the optical pathway of one or more of the beam 103, 105, etc.

In some embodiments, the assembly 104 can adjust the divergence of the light beam in one or more particular cross sectional axes of the light beam. Adjusting divergence of the light beam can result in adjusting the beam spot size of the light beam. For example, the assembly 104 can adjust the divergence of a particular axis, including a fast axis of the light beam 103, relative to a divergence of another particular axis, including a slow axis of the light beam 103. Such adjustment can result in uniform divergence of the beam 103 "downstream" of the assembly 104, relative to the beam 103 "upstream" of the assembly. Uniform beam divergence can result in a beam spot of the beam 103 which is approximately uniform in radius, or circular in shape. Uniform beam divergence can result in improved accuracy of reflection point correlation into point clouds of objects, as the shape of the reflected beam 107 received at the detector 114 can exhibit increased uniformity in shape across various distances of the reflection point 122 in the field of view 112. Such uniformity of the beam 107 cross section can enable the device 100 to more accurately determine properties of the reflection points 122 and distinguish whether to correlate certain sets of reflection points 122 into one or more point clouds.

In some embodiments, assembly 104 dynamically adjusts the divergence of beam 103, such that the scanned beam 105 has a particular cross sectional area, intensity, etc., Such dynamic adjustment can be implemented based on the size of the field of view 112, the determined depth of one or more detected reflection points 122 relative to the device 100, a predetermined scan protocol, etc. For example, where emitter 102 and scanner 108 are controlled to implement multiple successive scans of a field of view 112, where the scanner 108 "scans" the light beam 105 across one or more regions of the field of view 112 in a scan pattern, assembly 104 can adjust the beam 105 divergence between consecutive scans of the field of view. As a result, one scan can involve scanning a wide-divergence beam over the field 112, where the cross sectional area of the beam is relatively increased at various depths from the device 100, relative to a reference divergence value, and a next scan can include scanning a narrow-divergence beam over the field. Such consecutive scans can scan in a common pattern over the field 112. Where the beam is a sequence of pulses, a scan can include directing the sequence of pulses in a pattern across the field 112. The first scan of the beam, having a wider divergence, results in a pattern of pulses which have a wider beam cross section and are more likely to reach a surface of an object 120 in the field, relative to a pattern of beam pulses having narrower divergence which might "miss" an object 120 in the field 112. The second scan of the beam, having a narrower divergence, results in a pattern of pulses which have a narrower beam cross section and greater intensity and are thus more likely to reflect sufficiently intense light 107 off of a surface to be detected at detector 114, thereby allowing detection of reflection points 122 on objects with relatively low reflectivity.

In some embodiments, dynamic divergence adjustment includes adjusting beam divergence, beam spot size, etc. during a given scan of a field of view 112, such that beam divergence is at least partially changed, while the emitter 102 and scanner 108 are in the process of scanning a field of view 112 in one or more particular scan patterns. Such dynamic adjustment can be implemented in response to detection of one or more reflection points 122 in the field of view 112.

In some embodiments, device 100 adjusts the field of view through which the scanner 108 scans the light beam 105, based at least in part upon detection of one or more reflection points 122 in the field of view. Such adjustment can result in scanning particular regions of the field of view in which objects are determined to be located. For example, in the illustrated embodiment, field of view 112 can represent a maximum field of view through which scanner 1008 can scan the light beam 105. Such a maximum field of view can be referred to as the scan range of the device 100. The scanner 108 can scan the beam 105 through the field of view 112 and, in response to detecting reflection point 122, the device 100 can adjust the field of view through which the scanner 108 scans the beam 105 from the maximum field of view 112 to another field of view 132 which represents a limited region of the field of view 112. The field of view 132 can be determined based on the detection of the reflection point 122, so that the field of view encompasses a limited region of field 116 in which an object 120 which includes point 122 is located. As a result of narrowing the field of view, scans of the beam 105 can focus on detecting reflection points from various locations on the object 120, which can enable device 100 to generate a higher-fidelity point cloud of the object 120. In some embodiments, the device 100 can adjust the rate ("scan rate") at which the scanner 108 changes orientation to scan the light beam 105 across the field of view based on the size of the field of view 132. The scan rate can include a rate of orientation change of the scanner 108, a value associated with the magnitude of the individual step changes in scanner orientation between consecutive sets of beam pulses, etc. For example, in order to scan the full field of view 112 within a given period of time, scanner 108 may be required to execute relatively large steps in orientation change between directing different sets of beam pulses to separate regions of the field 112. Where the scanner 108 is controlled to scan a smaller field of view 132, the scanner can execute smaller steps in orientation change between directing different sets of beam pulses to separate regions of the field 132. As a result, where the field of view 132 narrows, relative to a scan range of the device, the scan rate of the scanner 108 can be decreased, so that the angle change between separate sets of beams 105 in a given scan of the field 132 are correspondingly decreased, which can result in higher-resolution point clouds of an object 120 in the field, as the point cloud can include more points 122.

In some embodiments, assembly 104 dynamically adjusts beam divergence based on detection of one or more reflection points 122 in the field of view 112, where the adjustment is based at least in part upon the size of the field of view 132, the depth of the reflection point 122 relative to the device, some combination thereof, etc. Where an object 120 is determined to be relatively close to the device 100, where the field of view 132 is narrowed relative to the maximum field 112, where the scan rate of the scanner is decreased, some combination thereof, etc., the divergence of a beam can be decreased so that the beam cross sectional area at the object 120 is also decreased, resulting in smaller reflection points 122 on the object and increased detail of the object in a generated point cloud. Where the object 120 is determined to be relatively distance from the device 100, where the field of view 132 is widened relative to the maximum field 112, where the scan rate of the scanner is increase, some combination thereof, etc., the divergence can be increased so that the regions of the field scanned by the beam 105 are increased to reduce a probability that an object 120 in the field is completely missed by the beam 105. While the resolution of the object 120 may be reduced via increased beam 105 divergence, the divergence can be adjusted dynamically during a scan, between consecutive scans, etc. so that a field of view can be first scanned with a wide-divergence beam to first detect the presence of objects 120 in various particular regions of the field 112 (referred to herein as "coarse scanning", "sensing", etc.) and then scanning one or more limited regions of the field 112 via a narrow-divergence beam at a lower scan rate, to generate a higher-resolution point cloud of the object which resolves various details of the object. The divergence of the beam can be dynamically selected and adjusted thereto based on one or more of the field of view 132, determined depth of a detected reflection point 122 in the field 132, a determined scan rate of the scanner 108, some combination thereof, etc.

Device 100 includes a controller 150, which can also be referred to herein as a "controller device". In some embodiments, controller 150 controls one or more of the above elements of device 100 to implement image mapping of a field of view 112. For example, controller 150 can control the emitting of a pulsed light beam by emitter 102, control scanner 108 to control scanning of one or more fields of view included within the scan range 112, control assembly 104 to control beam divergence, etc. Controller can control one or more elements of device 100, including assembly 104, scanner 108, etc. based on output data generated by detector 114, input data received from a user of device 100 via one or more user interfaces of device 100, etc. In some embodiments, the controller 150 controls one or more of the elements of device 100, including adjusting a position of one or more portions of lens element assembly 104, via an open loop control process. For example, the controller can access a stored relationship between a particular beam divergence, beam spot size, etc. and a particular position of one or more portions of the lens element assembly and, based at least in part upon determining a target beam spot size, beam divergence, some combination thereof, etc., the controller can adjust one or more portions of the lens element assembly 104 to a particular position which is determined to be associated with the target beam spot size. In some embodiments, the controller 150 controls one or more of the elements of device 100, including adjusting a position of one or more portions of lens element assembly 104, via a closed loop control process. For example, the controller can, based at least in part upon determining a target beam spot size, determine an initial adjustment to a portion of the lens element assembly, to a particular position, which is determined to adjust the beam spot size to match the target beam spot size adjust a portion of the lens element assembly 104 to a particular position, implement the initial adjustment of the lens element assembly portion, subsequently determine the beam spot size of the beam as feedback, determine a new adjustment to the lens element assembly which is determined to adjust the beam spot size to match the target beam spot size based on the beam spot size feedback, etc.

Figures 2A, 2B:
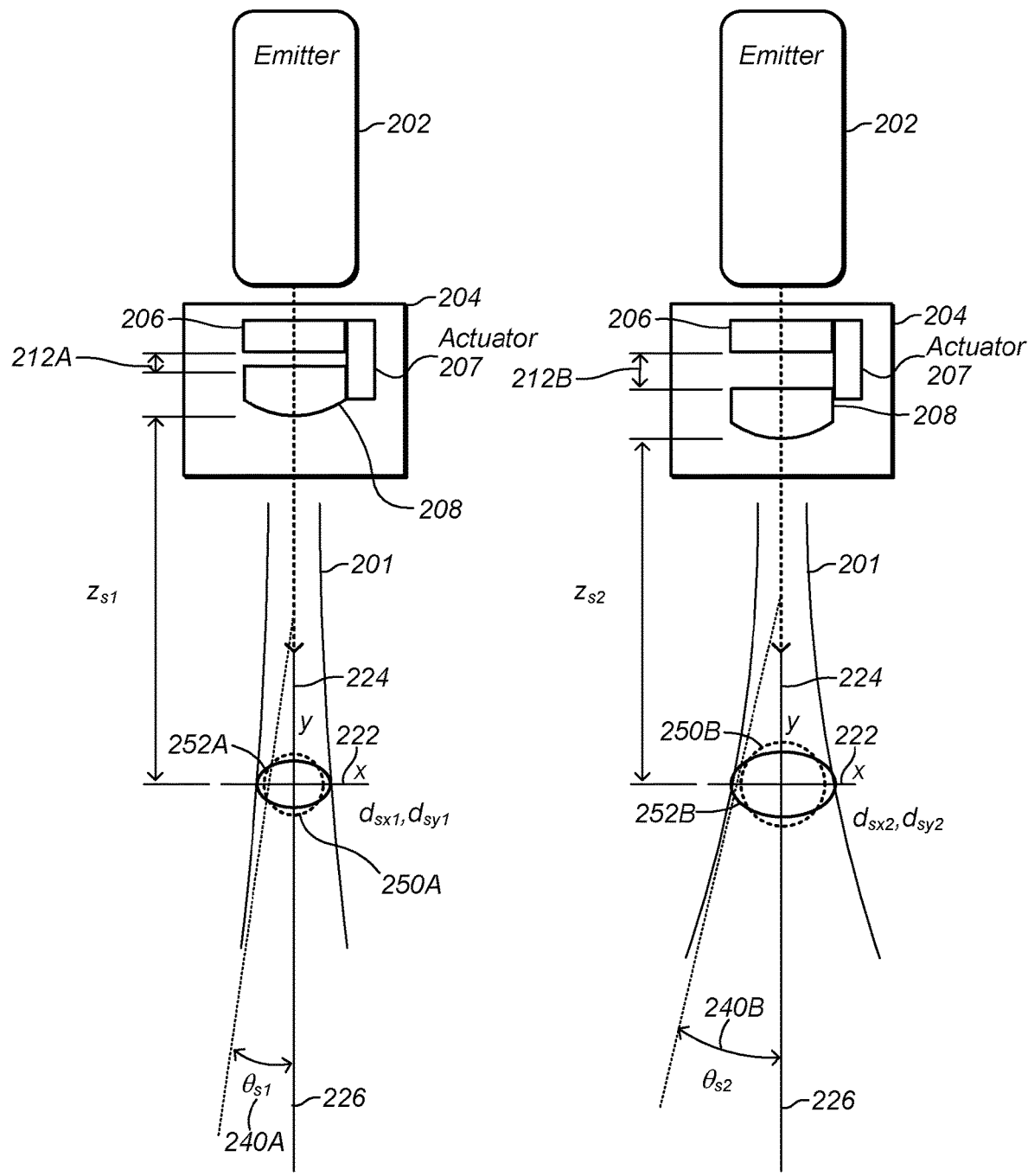
FIG. 2A-B illustrate an emitter which emits a light beam and a lens element assembly which adjusts the divergence of the beam along one or more cross sectional axes of the beam, according to some embodiments.

FIG. 2A-B illustrate an emitter which emits a light beam and a lens element assembly which adjusts the divergence of the beam along one or more cross sectional axes of the beam, according to some embodiments. The illustrated emitter and lens element assembly can be included in any of the above embodiments.

In some embodiments, a lens element assembly includes multiple lens elements which can be adjusted, individually, collectively, some combination thereof, etc. to adjust the divergence of the light beam. The lens element assembly can include one or more actuator mechanisms, also referred to herein as "actuators", which adjust one or more of the lens elements. In the illustrated embodiment, light emitter 202 emits a light beam 201, which can include a laser beam, along an optical axis 226, and lens element assembly 204 includes a first lens element 206, a second lens element 208, and an actuator 207, where at least one of the elements 206, 208 can be adjustably positioned ("adjusted") by actuator 207 to adjust the divergence of the beam 201 along one or more cross sectional axes 222, 224 of the beam 201. At least one of the lens elements can at least partially collimate the beam 201. For example, lens element 206 can at least partially collimate the beam 201. In some embodiments, one or more portions of the lens element assembly includes an actuated optical element which can condition a light beam, such that the spot size of the light beam, reflection spot size, etc. is adjustably controlled. In one example, the actuated optical element includes an actuated beam expander lens assembly which can adjustably control the diameter of the light beam spot size.

Actuator 207 can include one or more various actuators. For example, actuator 207 can include one or more magnetic actuators, voice coil motors, bi-stable actuators, etc. In some embodiments, actuator 207 can re-position a lens element between two or more discrete positions. For example, actuator 207 can include a bi-stable actuator which can adjustably position a lens element at one of two discrete positions. In some embodiments, actuator 207 can continuously re-position a lens element along a range of continuous positions. For example, actuator 207 can include a voice coil motor actuator which can adjustably position a lens element along a range of continuous positions. It will be understood that the actuator 207 can encompass any known actuator mechanism.

As shown in the illustrated embodiment, lens elements 206, 208 span transverse to optical axis 226. One or more of elements 206, 208 can be adjusted along the optical axis 226 to adjust beam divergence in one or more of the cross sectional axes 222, 224. As shown in FIG. 2A, lens element 208 is positioned at a particular distance 212A from lens element 206, which can be fixed in a particular position relative to emitter 202. Where lens element 208 is positioned at distance 212A from lens element 206, the beam 201 passing downstream from assembly 204 can exhibit a divergence 240A in a cross sectional axis 222 which corresponds to the fast axis of the beam 201. As shown, the cross section 250A of the beam 201, also referred to herein interchangeably as the beam spot 250A, at a distance 214A downstream of the lens element 208 has become ellipsoid rather than circular 252A, due to the divergence of the fast axis 222 and the slow axis 224, where slow axis is orthogonal to both axis 226 and axis 222. As illustrated, the cross section 222, or "beam spot" 222 extends along axes 222, 224 which are both orthogonal to each other and to optical axis 226 along which the beam 201 travels.

As shown in FIG. 2B, lens element 208 is adjusted to a new position which is at a particular distance 212B from lens element 206, where distance 212B is greater than that of distance 212A. As a result, as also shown, the divergence 240B of the beam 201 is increased along at least the fast axis 222, resulting in a beam cross section 252B, at distance 214B from lens element 208, which has a greater area than that of the cross section 252A. Note that distances 214A and 214B are located the same distance from a fixed element, including emitter 202, lens element 206, and assembly 204 as a whole, although distances 214A and 214B may not be equal, due to the adjusted position of the lens element 208.

In the illustrated embodiment, lens element 208 is adjustable to adjust the divergence 240A-B of the beam 201 along some or all cross sectional axes of the beam 201, so that the cross sectional area of the beam 201 is adjusted across a range of depths from the assembly 204, although the beam cross section increasingly diverges from circular to ellipsoid with increasing distance downstream from the assembly 204. Such adjustment of element 208 can be implemented by actuator 207. Such adjustment can be dynamic. Such adjustment can include translating one or more lens elements. In some embodiments, one or more of the lens elements in the assembly 204 is adjustable to adjust divergence in one or more particular cross sectional axes, relative to divergence in one or more other particular cross sectional axes, so that the shape of the beam 201 can be controlled across a range of distances downstream from the assembly 204. For example, in some embodiments, lens element 208 is adjustable in distance from lens element 206 to adjust a divergence of the fast axis 222, relative to to divergence of the slow axis 224, such that the cross section of the beam 201 maintains a generally circular shape 252A across a range of distances from the assembly, where not doing so could result in ellipsoid cross sections 250A across the same range. As shown in FIG. 2B, the element 208 can be translated, relative to element 206, to control both size and shape of the beam cross section 250B, also referred to herein interchangeably as the beam spot 250B, so that the cross section is increased, at a given distance, relative to cross section 250A and maintains a generally uniform beam shape.

In some embodiments, the assembly 204 includes multiple lens elements, where separate lens elements can be adjusted, by one or more actuators included in assembly 204, to adjust divergence along separate cross sectional axes of the beam. For example, an assembly can include a first lens element which is adjustable to adjust the beam divergence along the fast axis of the beam and a second lens element which is adjustable to adjust the beam divergence along the slow axis of the beam.

Figures 3A, 3B:
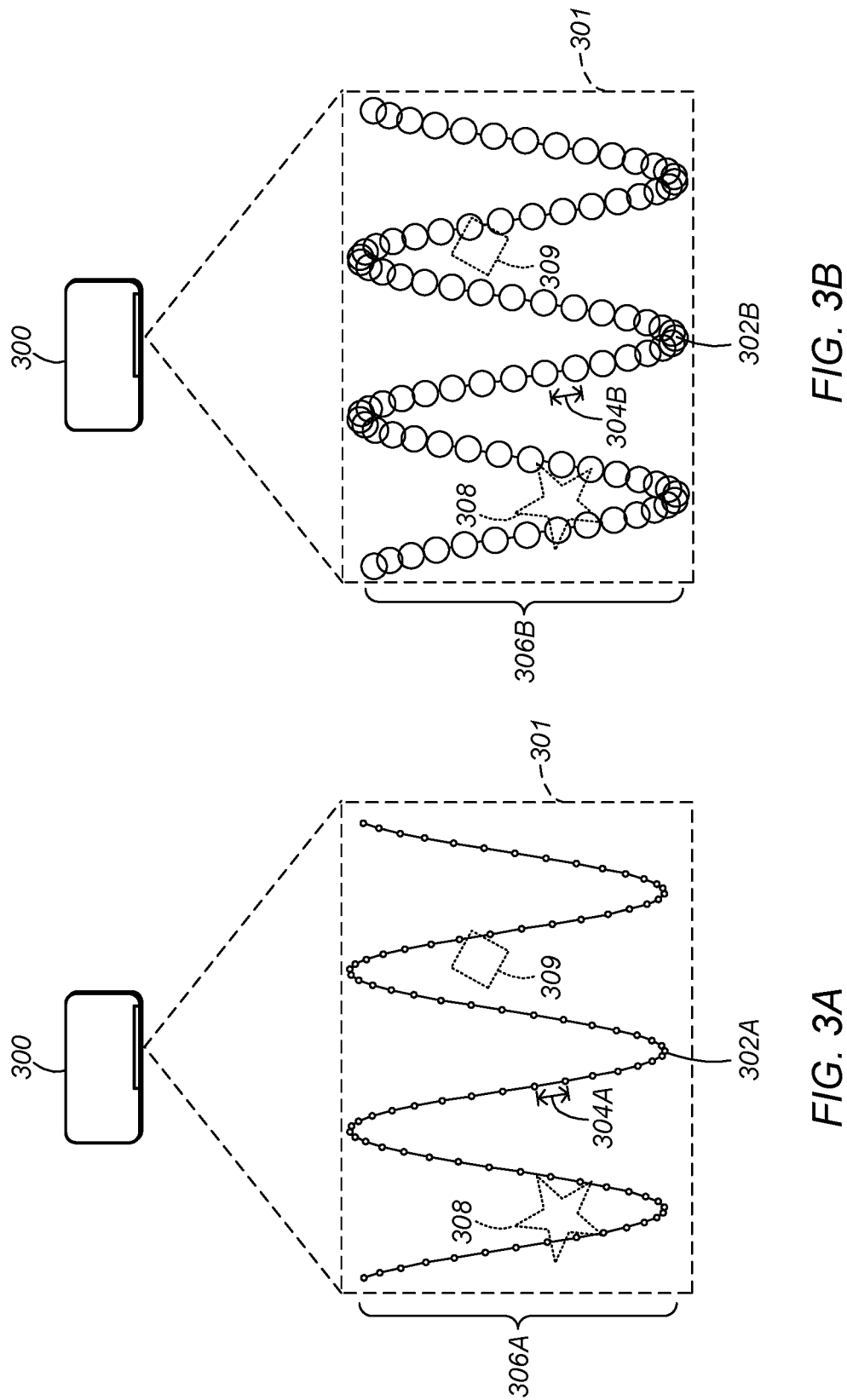
FIG. 3A-B illustrate adjusting beam divergence of a sequence of light beam pulses scanned by a light beam scanning device over a field of view in a scan pattern, according to some embodiments.

FIG. 3A-B illustrate adjusting beam divergence of a sequence of light beam pulses scanned by a light beam scanning device over a field of view in a scan pattern, according to some embodiments. The light beam scanning device 300 can be included in any of the above embodiments.

In some embodiments, to generate an image map of a scene, a light beam scanning device scans a light beam over a field of view in which the scene is included, where the image map is generated based on generated point clouds of various objects in the scene, where the point clouds are generated based on detecting reflection points in the field of view and correlating various sets of reflection points to generate point clouds of the various objects based on similar properties of the various sets of reflection points. Where the light beam includes a sequence of beam pulses, the scanning can include controlling a scanner of the device to direct various pulses towards various regions of the field of view in a scan pattern of pulses through the field of view. The scan pattern can include a pattern of pulses which are angularly spaced apart, within the field of view, based at least in part upon one or more of a particular scan rate of the scanner, a particular pulse rate of the emitter, etc. The pulses can have one or more various divergences which can be at least partially adjusted by a lens element assembly included in the light beam scanning device.

In some embodiments, one or more of the beam pulse divergence, scan rate, and field of view can be adjusted. Such adjustment can be dynamic, such that it occurs during a given scan of a field of view, is based at least in part upon the scan rate and field of view, is based at least in part upon output generated by a detector included in the light beam scanning device, some combination thereof, etc. A given "scan" of a field of view can include executing an individual particular "sweep" of the light beam pulses over the field of view according to a particular scan pattern, such that consecutive "sweeps of the pulsed light beam over the field of view according to one or more scan patterns comprise consecutive individual scans of the field of view.

In some embodiments, beam divergence is adjusted, based at least in part upon the field of view, scan rate, etc. to adjust the likelihood of detecting objects in the field of view, adjust the resolution of the objects in the point clouds of the objects, etc. Such adjustment can be implemented by one or more lens element assemblies included in the device. Such adjustment can occur over one or more scans of the field of view, where one or more of field of view, scan rate, and beam divergence can be dynamically adjusted to control resolution of generated point clouds of objects detected in a field of view based on detected reflection points.

As shown in FIG. 3A, device 300 initiates a scan of a field of view 301 by "sweeping" a pulsed light beam over a portion of the field 301 in a particular pattern 306 of individual pulses 302A of the light beam. The illustrated pulses 302A in FIG. 3A illustrate the beam spots, and relative beam spot size, of the light beam scanning the field of view 301 from a perspective of one or more portions of the device 300. The pattern 306A is at least partially based on the scan rate of the scanner in the device 300, which can adjust the direction of each pulse 302A within the field 301 and the angular spacing 304A between consecutive pulses 302A. As shown, the pulsed beam scanned through the field 301 in FIG. 3A has a relatively narrow beam divergence, such that the beam spot of each pulse 302A is relatively small in beam spot size. While small beam spot size of the scanned beam can result in relatively smaller reflection points, which can enable resolution of finer details of an object that larger beam cross sections may be hindered in resolving, the smaller cross sectional area of pulses 302A and the spacing 304A between the pulses 302A can result in at least some of the detail in a field of view being missed by the scan. For example, as shown, two objects 308, 309 are located within the field of view 301, but none of the beam pulses 302A reflect off of either of the objects 308, 309 when the scan 306A is executed as shown, based at least in part upon the small area of each pulse 302A and the spacing between the pulses 304A.

Adjusting the scan rate of the device 300, so that the spacing 304A between consecutive pulses 302A can increase the likelihood of reflecting a pulse off of an object in the field 301. In some embodiments, reducing the spacing 304A between pulses 302A requires that additional pulses be scanned over the field 301 to scan the field. Scanning such additional pulses results in a given scan requiring a greater time period to execute. In some embodiments, the time period in which an individual scan can be executed is limited to a maximum time period. As a result, in order to scan the field 301 with pulses 302A having a relatively small beam spot, device 300 may be required to space 304A the pulses 302A apart in the scan of the field 301, such that there are gap spaces between the spaced pulses 302A in which an object may be missed by the pulses 302A, thereby preventing detection of the object by device 300.

As shown in FIG. 3B, the beam divergence can be adjusted to increase the beam spot size of the beam pulses 302B such that likelihood of detection of the presence of objects 308, 309 in the field of view 301 can be increased when the beam is scanned over the field 301 at the adjusted divergence in scan pattern 306B, relative to the pattern 306A in FIG. 3A. In FIG. 3B, while the spacing 304B between the individual pulses 302B may be similar to that of the spacing 304A in pattern 306A, the greater divergence of the beam results in the pulses 302B individually and collectively covering a greater portion of the field of view 301 in a given scan, relative to the pulses of the scan in FIG. 3A. In fact, as shown, many pulses 302B may overlap across common regions of the field of view. As a result, the probability that an object in the field 301 will be completely missed by the scan pattern 306B is reduced, relative to a similar scan pattern 306A with similar scan rate and narrower divergence of the beam. The illustrated pulses 302B in FIG. 3B illustrate the beam spots, and relative beam spot size, of the light beam scanning the field of view 301 from a perspective of one or more portions of the device 300.

As shown in FIG. 3B, the scan pattern 306B results in at least two reflection points being detected for each of objects 308, 309. While the detection points detected based on the scan in FIG. 3B may not result in a high-resolution point cloud which resolves the full detail of the objects 308, 309, based at least in part upon the relatively large size of the beam spot of the scanned beam resulting in relatively large reflection points which can at least partially obscure various details of the objects, the presence of the objects in the field 301 can be detected based on the detected reflection points on each of the objects. Subsequently, the field of view 301 can be narrowed to encompass a limited region of field 301 which also encompasses one or more of objects 308, 309 and a subsequent scan can be executed, with a lower scan rate and narrower beam divergence, and thus smaller resulting beam spot size, such that a higher resolution point cloud can be generated for one or more of the objects which provides better resolution of the object details relative to scan 306B.

Such adjustment of scan rate, field of view, beam divergence, beam spot size, etc. can be implemented during a given "scan" of the field of view according to one or more patterns.

In some embodiments, scans 306A, 306B are executed by device 300 over field 301 consecutively as scans having alternative beam divergence, so that a wide-divergence scan 306B over a particular region of the field 301 is followed by narrow-divergence scan 306A. Such an alternation of divergence, and thus beam spot size, between separate scans can enable detection of the presence of objects in the field 301 via both wide-divergence scans which are more likely to reach an object based at least in part upon the relatively larger beam spot size of the scanned beam and narrow-divergence scans which are more likely to result in detection of a reflection point from a low-reflectivity surface based at least in part upon the relatively smaller and thus higher intensity beam spot size of the scanned beam.

A light beam scanning device 300 can be limited by the amount of time available in which to execute a scan of a field of view 301; as a result, while scanning a field 301 with pulses having the minimum possible divergence and minimum possible angular difference between pulses may result in maximum resolution, scan times may restrict the ability of device 300 to execute such a scan over an entire selected field 301 of view at such resolution may be complicated. As a result, adjusting the beam divergence can enable initial detection of various objects in a wider field of view at low resolution and dynamic adjustment of one or more of the beam divergence, scan rate, field of view, etc. to generate higher-resolution mapping of the various objects initially detected within the wider field of view. In some embodiments, such adjustment of beam divergence can result in optimizing processing resources, as the number of scans and processing capacity required to generate high-resolution image maps of various objects in a scene can be reduced as the objects can be quickly identified in a wide-divergence scan and then the objects can be mapped via a narrow-divergence scan of the limited regions of the field of view in which the objects are located.

In some embodiments, device 300 scans a pulsed light beam over a given portion of a field of view based on input data received from one or more other elements of the device. For example, the device 300 can include a camera device which can generate one or more images of the scene included in field 301, including an image of objects 308, 309. In some embodiments, device 300 includes one or more computer systems which can process the images captured by the camera device to identify objects 308, 309 in the image and, based on such identification, device 300 can scan limited regions of field 301 in which objects 308, 309 are located to generate point clouds of the object 308, 309. Such point clouds can be used at device 300 to generate an image of the objects 308, 309, modify the image captured by the camera device, etc. In some embodiments, the device 300 includes a user interface and can scan a light beam over a region of a field of view based on user interaction with an image presented to the user via the user interface. For example, upon executing the scan pattern 306B illustrated in FIG. 3B, device 300 can correlate the detected reflection points into low-resolution point clouds of objects 308, 309 and display an image of such objects on the user interface of device 300 based on the point clouds. The device can scan a limited region of the field 301 based on a user interaction with the displayed image, including a user command to scan a particular region of the field, a user interaction with a portion of the image in which the image maps of one or more of the objects 308, 309 are displayed, etc. User commands can be received at the device 300 via tactile interaction with a display (e.g., a touchscreen display), audio interaction (e.g., spoke commands), optical interaction (e.g., hand gestures captured by a camera device included in device 300), etc.

Figure 4:
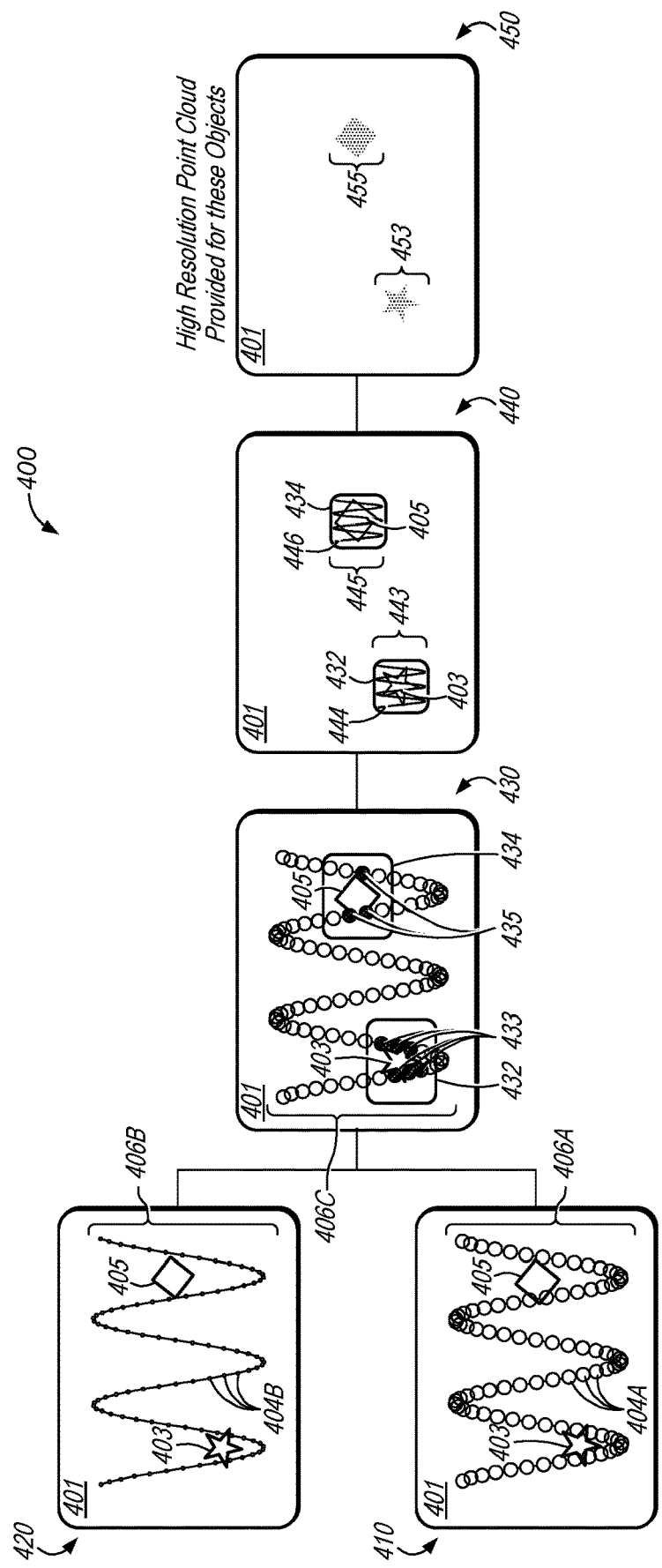
FIG. 4 illustrates dynamically adjusting beam divergence to generate variable-resolution image maps of various objects within the field of view of a light beam scanning device, according to some embodiments.

FIG. 4 illustrates dynamically adjusting beam divergence, and thus beam spot size, to generate high-resolution image maps of various objects within the field of view of a light beam scanning device, according to some embodiments. Such dynamic adjusting shown in FIG. 4 can be implemented via any of the above embodiments of a light beam scanning device and can be managed by one or more computer systems associated with the light beaming device.

The dynamic adjustment process 400 illustrated in FIG. 4 includes implanting one or more initial scans of a field of view 401. The field of view 401 can include the maximum available field of view, or "scan range," of the light beam scanning device executing the scan.

In some embodiments, the field of view can be scanned via one or more various individual scans of a light beam over the field where the individual scans are of the light beam at difference divergences. Such varying beam divergences can be executed via a lens element assembly included in the light beam scanning device. The various scans executed at various beam divergences can facilitate detection of objects within the field of view via optimizing various different beam properties. For example, a scan of a wide-divergence beam over the field of view can increase the probability that the beam will reflect off of a surface of an object in the field, thereby resulting in detection of the object via detecting the reflection point, based on an increased beam cross sectional area ("beam spot") due to increased beam divergence. In another example, a scan of a narrow-divergence beam of the field of view can increase the probability that the beam will reflect off of low-reflectivity surfaces, from which the wide-divergence beam may not reflect off of with sufficient intensity to be detected at a detector of the light beam scanning device, as the intensity of the reflection point can be increased due to the smaller beam cross sectional area.

As shown at 410, a wide-divergence scan 406A of the field 401 can include scanning a sequence of beam pulses 404A over a portion of the field in a particular scan pattern. As shown, the wide-divergence scan 406A can result in at least some of the beam pulses at least partially overlapping with one or more objects 403, 405 located in the scene that is within the field of view 401.

As shown at 420, a narrow-divergence scan 406B of the field 401 can include scanning a sequence of beam pulses 404B over a portion of the field in a particular scan pattern. The wide-divergence scan 406A pattern and the narrow-divergence scan 406B pattern can be similar, such that both scans 406A-B pass over the same portions of the field of view 401, thereby enabling detection of low-reflectivity surfaces, via scan 406B, which may not be detected via scan 406A. In some embodiments, one or more of the scans 406A-B shown in 410, 420 are omitted from the process 400. For example, scan pattern 406B can be omitted, such that a single wide-divergence scan shown in 410 is executed over the field 401.

As shown at 430, the presence of objects 403, 405 in the field of view 401 is determined based on detecting reflection points which result from at least a portion of one or more beam pulses, scanned over the field in one or more of scans 406A-B, reflecting off of the objects and being received at a detector associated with the light beam scanning device executing the scans. As shown, reflection points 433 are detected which indicate the presence of object 403 within field 401, and reflection points 435 are detected which indicate the presence of object 405 within field 401. Both reflection points 433 and 435 result from the wide-divergence scan 406A shown in 410. As shown at 420, the narrow-divergence scan 406B may result in at least partially failing to detect the presence of one or more objects within the field, due to the relatively smaller beam cross sectional area and angular spacing between separate beam pulses 404B. As a result, while the scan 406A at 410 results in detection of the presence of objects 403, 405 in the field 401, the detailed shape, structure, etc. of the objects 403, 405 may not be fully resolved from the reflection points 433, 435. For example, a point cloud of object 403, generated from correlation of reflection points 433, may not resolve the structure of object 403 as a five-pointed star.

As further shown at 430, based at least in part upon detecting the reflection points 433, 435, new fields of view associated with said reflection points are established as fields 432, 434. Each separate field 432, 434 can be sized based on properties of the reflection points 433, 435, which can be correlated together to establish a "coarse" point cloud of each object 403, 405. The fields 432, 434 can be sized based on an estimated size of the object within the field 401, which can be determined based on determining which beam pulses 404A reflected off of objects 403, 405, resulting in reflection points 433, 435, and which pulses did not reflect off of any nearby points, as shown in 430. As a result, the field 432, 434 can be sized to correspond to an estimation of the size of the objects within the field 401. In some embodiments, where an image of the field 401 is captured via another device, including a camera device, the size and shape of the objects within 401 may be determined from the captured image, such that the fields 432, 434 can be determined based on the determined size and location of the objects within the field 401 based on the captured image. As further shown, the fields 432, 434 can include limited regions of the field 401.

At 440, the light beam device executes scans of the fields 432, 434 with narrow-divergence beam pulses. The scans can include scans of the fields 432, 434 to the exclusion of the remainder of the field 401 beyond fields 432, 434. As shown, the scans 443, 445 can include a scan pattern of the respective fields 432, 434 which is adjusted to correspond to the size of the respective fields 432, 434. In addition, as shown, the angular spacing ("scan rate") between separate beam pulses 444, 446 in the scans, including the divergence of the beam pulses themselves can be adjusted to cause the scans 443, 445 to scan the respective regions 432, 434 with narrow-divergence beam pulses at a reduced scan rate. As a result of the narrow beam divergence, which can result in smaller cross sectional beam area, and the low scan rate, which can result in an increase in the number of beam pulses in a given area, the number and concentration of reflection points on the objects 403, 405 within the fields 432, 434 can be increased, relative to the scans at 410, 420. As a result, point clouds of the objects generated via correlation of reflection points detected as a result of scans 443, 445 can have an increased level of resolution of the detail of the objects 403, 405, relative to that of point clouds of said objects resulting from the detected reflections points 433, 435 resulting from scan 406A.

At 450, reflection points 453, 455 resulting from the scans 443, 445 are detected. As shown, the detailed shapes and structures of the objects 403, 405 are more highly resolved by reflection points 453, 455, relative to the reflection points 433, 435 resulting from the scan 406A. The points 453 can be correlated to generate a point cloud of the object 403, and the points 455 can be correlated to generate a point cloud of the object 405, which can be used as part of generating one or more of an image of the scene within field 401, a 3D map of the scene, tracking the position of one or more of the objects 403, 405 through the scene, etc. For example, object 403 may be identified as a particular object ("five-pointed star") based on the correlation of the point objects 453, and the position of the object 403 may be tracked based on such identification. Such tracking can be tracked as part of image focus based on the position of object 403, processing the motion of object 403 within the field 401 to determine whether an input command is received, etc. In some embodiments, such tracking is based at least in part upon a user interaction with the light beam scanning device executing process 400, including a command which specifies a particular object and commands tracking of the object (e.g., "track the star").

Figure 5:
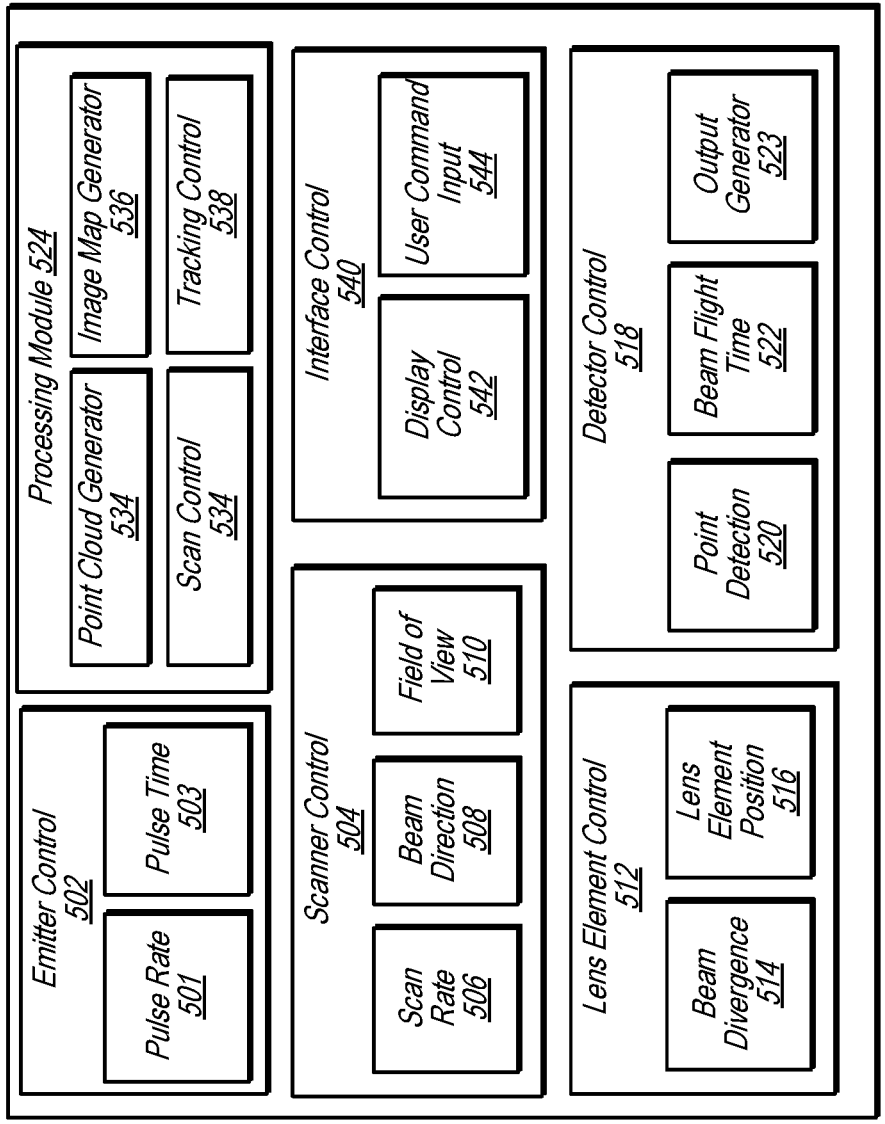
FIG. 5 illustrates a controller device which can be included in a light beam scanning device, according to some embodiments.

FIG. 5 illustrates a controller device which can be included in a light beam scanning device, according to some embodiments. The controller device can be included in any of the above embodiments of a light beam scanning device and can be implemented, at least in part, by one or more computer systems, as discussed below. Controller device 500 includes multiple various modules, described herein, which can be implemented by one or more instances of computer systems.

Device 500 includes an emitter control module 502 which controls emission of a light beam by an emitter device included in the light beam scanning device. Such control can include selecting generating an emission control signal which is transmitted to one or more of the emitter device, a power source electrically coupled to the emitter device, etc. which causes the emitter device to emit the light beam. The emission control module can, in some embodiments, selectively control a sequence in which the emitter device emits a sequence of beam pulses. Such control can include controlling the pulse rate 501. In some embodiments, module 502 can record the time 503 at which individual pulses are emitted by the emitter device.

Device 500 includes a scanner control module 504 which controls a scanner device included in the light beam scanning device, such that the module 504 controls scanning of a light beam, emitted by the emitter device, over one or more regions of the scan range of the scanner device. Scan control module 504 can include a scan rate module 506 which determines the scan rate associated with the scanner device during one or more various scans through the scan range, a beam direction module 508 which determines a direction of the light beam as directed by the scanner device at one or more points in time, and a field of view module 510 which determines a field of view of the scanner, which determines the region of the scan range over which the scanner device is controlled to "scan" the light beam. Module 510, in some embodiments, determines a pattern in which the scanner device is controlled to sweep the light beam during a given period of time. As shown in FIG. 3-4, such a pattern can include a sinusoidal pattern. Module 508, in some embodiments, determines a separate adjustment of the scanner device corresponding with each separate beam direction through the field of view, such that the module 508 determines the adjustment to the scanner device, by one or more actuator mechanisms associated with the scanner, needed to direct the light beam in a given direction. Where the scanner device includes a mirror which can be adjusted in orientation, such determination can include determining an orientation of the mirror device which corresponds with the mirror device directing the light beam in a particular direction according to a determined scan pattern. Module 506, in some embodiments, determines a particular rate at which the scanner device changes the direction in which the light beam is directed, an angular spacing between separate directions of separate light beam pulses, etc. For example, where the emitted light beam is a sequence of pulses, module 506 determines an orientation change rate which corresponds with the pulse rate and a determined angular spacing between separate desired directions of separate sets of beam pulses according to the determined scan pattern. In some embodiments, module 504 controls one or more elements of scanning a light beam over a field of view by the scanner, including controlling the adjustments to the scanner by one or more actuators during a scan, at one or more determined scan rates, to scan the light beam over a determined field of view in one or more various scan patterns.

Device 500 includes a lens element control module 512 which, in some embodiments, controls a lens element assembly included in the light beam scanning device to control beam divergence of the light beam along one or more cross sectional axes of the beam. Such control can include adjusting one or more lens elements included in the lens element assembly, based at least in part upon generating one or more lens element adjustment command signals which can be transmitted to one or more actuators associated with the one or more lens elements to cause the actuators to adjustably position the one or more lens elements. Module 512 can include a beam divergence module 514 which can determine a particular divergence, along one or more cross sectional axes, of the light beam and a lens element positioning module 516 which can determine a magnitude of adjustment of the position of one or more lens elements within the lens element assembly. Beam divergence can be determined separately for separate cross sectional axes of the light beam. For example, a first divergence can be determined for a first axis of the beam and a second divergence can be determined for another separate axis of the beam, which can be orthogonal to the first axis. Module 516 can determine adjustments to the position of one or more lens elements, based on the determined beam divergences. In some embodiments, module 516 can determine separate and independent adjustments to separate lens elements in the lens element assembly to independently adjust beam divergence along separate cross sectional axes of the beam. For example, where module 514 determines a common divergence for all cross sectional axes of the beam, module 516 can determine a first adjustment to a first lens element in the lens element assembly, by a first actuator, which adjusts the beam divergence of one cross sectional axis to the common divergence and can determine a second adjustment to a separate lens element in the lens element assembly, by a second actuator, which adjusts the beam divergence of another separate cross sectional axis to the common divergence. In some embodiments, module 514 determines a divergence of one or more axes of the beam based on one or more various inputs, including a desired cross sectional area of the beam at a certain depth from the scanner, a desired cross sectional shape of the beam, a determined field of view of the scanner, a determined scan rate of the scanner, some combination thereof, etc. Module 512, in some embodiments, controls one or more actuators in the lens element assembly based on the lens element positions determined at module 516. In some embodiments, module 512 adjusts beam divergence of the light beam, such that module 512 controls the beam spot size of the light beam, based at least in part upon controlling the beam spot size to match a selected beam spot size, where the selected beam spot size is selected from a set of predetermined beam spot sizes. In some embodiments, module 512 controls the beam spot size of the light beam based at least in part upon one or more received beam spot size commands which specify a particular beam spot size. A received beam spot size command can include one or more of a user command generated as a result of an end-user interaction with a light beam scanning device in which controller device 500 is included, a computer command generated by one or more computer systems based on one or more program instructions stored in one or more memory devices of the one or more computer systems, some combination thereof, etc.

Device 500 includes a detector control module 518 which receives and processes data received from a detector included in the light beam scanning device. The detector can detect a light beam reflected off of a surface within the field of view in which the light beam is directed by the scanner device. The detector device can include one or more sensor elements which detect the reflected light beam. Module 518 can include a point detection module 520 which receives an indication that a reflected light beam is detected at one or more sensor elements of the detector. Based on the detection, module 520 can determine the presence of a reflection point within the field of view in which the emitted light beam is directed. In some embodiments, module 520 can determine, based on data received from the detector in association with the indication of detection of a reflected light beam, a time at which the reflected light beam is detected at the detector. Module 518 can include a flight time module 522 which can determine the time of flight of a light beam to and from the reflection point within the field of view. The flight time can be determined based at least in part upon the time (also referred to as "timestamp") at which a reflected light beam pulse was detected at the detector, a time (also referred to as "timestamp") at which a light beam pulse was emitted from the emitter device, a pulse rate of the emitter device, some combination hereof, or the like.

In some embodiments, module 522 can determine at least a depth of the detected reflection point within the field of view based at least in part upon the time of flight of the light beam to and from the reflection point (i.e., between one or more portions of the light beam scanning device, including the scanner, and the reflection point) and an estimated speed of light within the medium in the field of view. For example, based at least in part upon the determined time of flight of a light beam pulse to and from the reflection point, and an estimate of the speed of light in the medium through which the light beam pulse travels, the distance traveled by the light beam pulse to the reflection point from one or more portions of the device, including the scanner, can be estimated.

Module 518 can include an output generator module 523 which generates an output based on the detection of a reflected light beam at the detector device. Detection of a reflected light beam can comprise detection of a reflection point within the field of view of the light beam scanning device. The output can include one or more of an indication of a reflection point within the field of view, a determined flight time of a light beam to and from the reflection point, an intensity of the light reflected from the reflection point, a determined depth of the reflection point within the field of view, etc. In some embodiments, module 518 can determine a position of the detected reflection point within the field of view, relative to one or more elements, portions, etc. of the light beam scanning device, based at least in part upon a determined depth of the reflection point within the field of view and a determined adjusted position of the scanner concurrently with at least a portion of the time period during which the light beam is travelling to and from the reflection point. An indication of the position of the reflection point, which can include a depth, azimuth, and elevation of the reflection point within the field of view, and intensity of the reflection point, some combination thereof, etc. can be included in the generated output as part of a set of properties associated with the reflection point.

Device 500 includes a processing module 524 which receives and processes data from various one of modules 502, 504, 512, 518 and generates image maps of one or more objects, scenes, etc. within a field of view of the light beam scanning device based at least in part upon the data. Module 524 includes a point cloud generator module 534 which can receive and process one or more sets of data associated with various reflection points detected at a detector device of the image beam scanning device. Each set of data, which can be generated at module 534 based on output received from one or more of modules 502, 504, 518, can include data indicating a depth, azimuth, elevation, intensity, some combination thereof, etc. of a detected reflection point within the field of view, relative to one or more portions of the image beam scanning device, including the scanner device. In some embodiments, a given set of data includes information identifying the set as being associated with a particular scan of the field of view.

In some embodiments, module 534 correlates one or more sets of point data into a set of reflection points which comprise a "point cloud" of an object located within the field of view. Such correlation can include comparing various property data of the various sets of data associated with the various separate detected reflection points and correlating two or more points into a point cloud based at least in part upon determining a similarity between one or more properties of the two or more points. For example, two points determined to have one or more of depth, azimuth, and elevation which are similar within a predetermined margin (e.g., difference in depth is less than 1 mm, difference in azimuth is less than 0.01 degrees, etc.) may be correlated into a common point cloud. Module 524 can include an image map generator module 536 which can implement the correlation of various sets of data associated with separate detected reflection points to generate point clouds of various objects. Module 536 can, based on the various generated point clouds of objects located within a field of view, generate one or more image maps of a scene, within the field of view, which includes the one or more objects. Such a generated image map can include an image of one or more of the objects included in the scene, where the image can be two-dimensional. The image map can include a 3D map of one or more objects within the scene and can include a 3D map of some or all of the entire scene. For example, module 536, in some embodiments, analyzes generated point clouds and identifies a point cloud of an object as being associated with a particular known object (e.g., a fork, a human hand, a human hand making a particular gesture, etc.) and, based on the identification, generates an image map of the particular object. Module 524 includes a scan control module 534 which can control one or more of the emitter, scanner, lens element assembly, detector, etc. of the light beam scanning device, via controlling some or all of modules 502, 504, 512, 518. Module 534 can control the various modules to cause the light beam scanning device to execute particular scans. For example, based on generating a point cloud, at module 534, of an object in a field of view based on correlating reflection points detected as a result of a wide-divergence scan of the field of view, module 534 can determine that the resolution of the point cloud does not meet a threshold minimum and can subsequently control modules 502, 504, 512 to execute one or more additional scans which result in higher-resolution point clouds of the object. Such control can include controlling module 504 to narrow the field of view around the detected object and scan at a lower rate through the narrowed field, controlling module 512 to narrow the divergence of the beam scanned through the narrowed field, some combination thereof, etc. Module 524 includes a tracking control module 538 which, in some embodiments, responds to identification of a particular object within the field of view by generating commands to one or more of modules 502, 504, 516 to control the light beam scanning device to scan the regions of the field of view in which the identified objects are located, such that the objects are tracked within the field of view over time.

In some embodiments, module 524 controls one or more of modules 502, 504, 512 based at least in part upon output data received from one or more of the modules included in module 500, including, without limitation, output generated at module 518. For example, where module 534 determines, based on output data generated by module 518 as a result of a scan of a maximum field of view of the light beam scanning device, that one or more reflection points are detected within a particular region of the field of view, the module 534 can command modules 502, 504, and 512 to narrow the field of view around the detected reflection points, narrow the beam divergence such that higher-resolution scans of the narrowed field of view are implemented, and scan the narrow field of view according to an adjusted scan rate and the adjusted beam divergence. As a result, module 534 can respond to initial, low-resolution detection of one or more objects within a field of view by commanding the modules 502, 504, 512 to control various elements of the light beam scanning device such that a higher resolution scan of the one or more objects is implemented.

Device 500 includes an interface control module 540. Module 540 can enable user interaction with one or more modules of device 500. Module 540 includes a display control module 542 which can manage displays of one or more image maps, generated at module 536, on one or more display user interfaces associated with the light beam scanning device. In some embodiments, module 542 generates interactive displays, where a user can interact with one or more portions of a displayed image map, via a user interface, to provide input commands to device 500. Module 540 includes a user command input module 544 which can register the receipt of one or more particular user commands, based at least in part upon a user interaction with a user interface. For example, where module 542 displays an image map of a scene which includes an image map of an object, generated based on a low-resolution point cloud of the object, on a display interface, module 544 can receive a user command to implement a high-resolution scan of a limited region of the field of view in which the object is located based on a user interaction with the portion of the image map, of the scene, in which the object is located. In some embodiments, the module 544 can register receipt of certain user commands based on user interaction with various user interfaces, including audio commands received via an audio interface, commands received via a keyboard interface, etc. module 540 can forward the received user commands to module 524, where module 524 can control various elements of the light beam scanning device based at least in part upon the user commands.

Figure 6:
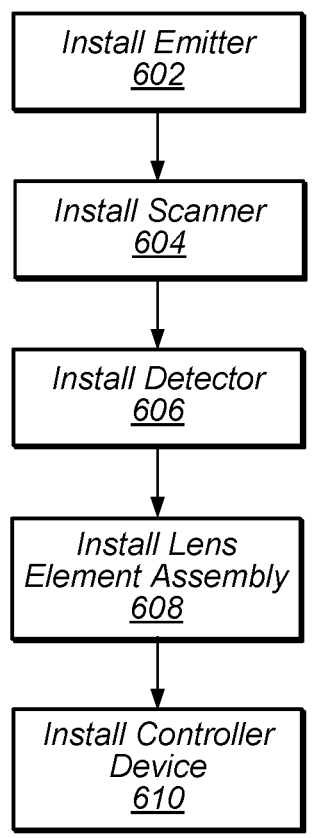
FIG. 6 illustrates configuring a light beam scanning device to scan a light beam having a dynamically-adjustable divergence within a scan range of the device, according to some embodiments.

FIG. 6 illustrates configuring a light beam scanning device to scan a light beam having a dynamically-adjustable divergence within a scan range of the device, according to some embodiments. The configuring can be implemented with regard to any or all of the embodiments described above. Configuring the light beam scanning device can include modifying at least a portion of a light beam scanning device, assembly of a light beam scanning device, etc. The light beam scanning device can include a light detecting and ranging (LIDAR) device.

At 602, a light beam emitter, also referred to herein as an emitter device, is installed in a light beam scanning device. Such installation can include coupling the emitter device to a structural frame of the light beam scanning device, electrically coupling the emitter device to an electrical power source, etc. The light beam emitter can include a laser emitter, including a laser diode, which can emit a laser light beam. The light beam emitted by the emitter device can include one or more of a continuously-emitted light beam, a sequence of light beam pulses, where the sequence of pulses can be determined, some combination thereof, etc.

At 604, a scanner device is installed in the light beam scanning device. Such installation can include coupling the scanner device to a structural frame of the light beam scanning device, electrically coupling the scanner device to an electrical power source, etc. The scanner device can be coupled at a location in the light beam scanning device which is at least partially intersected by the beam pathway of the light beam emitted by the emitter device. The scanner device can include, in some embodiments, a reflecting device, including a mirror device, which can be adjustably positioned in various orientations, based at least in part upon an action of an actuator device, to direct the light beam into one or more various directions within a field of view external to the light beam scanning device. The actuator device can be included in the scanner device. The range of directions into which the scanner device can direct the light beam, based on the range of orientations through which the scanner device can be adjustably positioned, can be referred to as the scan range of the scanner device, the scan range of the light beam scanning device, the maximum field of view of said device, some combination thereof, etc. The scanner device can be adjusted through a range of positions to "scan" a light beam through one or more regions of the scan range, including a particular determined field of view within the scan range.

At 606, a light detector device, also referred to herein as a detector device, detector, etc., is installed in the light beam scanning device. Such installation can include coupling the detector device to a structural frame of the light beam scanning device, electrically coupling the detector device to an electrical power source, etc. The detector can include one or more sensor elements which can detect a light beam, and the detector can generate an output signal based on detection of a light beam at one or more of the sensor elements of the detector. The detector can detect a reflection of a light beam, directed into the field of view, off of a surface of one or more objects located within the field of view. Based on such detection, the output signal generated by the detector can indicate a reflection point within the field of view. In some embodiments, the detector determines at least a depth of the reflection point within the field of view based on a time of flight of the light beam from at least a portion of the light beam scanning device to the surface on which the reflection point is located, Such determination can be based at least in part upon a correlation of a time at which a light beam, light beam pulse, etc. is emitted from the emitter device with a time at which a reflected light beam is detected at the detector. In some embodiments, the output signal indicates an azimuth and elevation of the reflection point within the field of view, based at least in part upon the time of flight of the light beam to the reflection point, and a position of the scanner device concurrently with at least a portion of the time period during which the light beam is directed by the scanner device into a particular direction within the field of view. In some embodiments, the detector includes a single sensor element.

At 608, a lens element assembly is installed in the light beam scanning device. Such installation can include coupling the lens element assembly to a structural frame of the light beam scanning device, electrically coupling the lens element assembly to an electrical power source, etc. The lens element assembly can include one or more lens elements which can be adjustably positioned to adjust a divergence of the light beam emitted by the emitter device. The lens elements assembly can be coupled to the light beam scanning device at a location intersected by the beam pathway of the emitted light beam. Such a location can be located between the emitter device and the scanner device, such that the lens element assembly is located "downstream" of the emitter device and "upstream" of the scanner device. The lens elements can include a set of multiple lens elements, one or more of which can be adjustably positioned by action of one or more actuator elements. The actuator elements can be included in the lens element assembly and can adjustably position one or more individual lens elements in a directional axis which is parallel with the beam pathway through the lens elements assembly. As a result, one or more of the lens elements can be adjustably translated in parallel to the direction of the light beam through the assembly. One or more of the lens elements can adjust divergence of the light beam in one or more cross sectional axes through adjustable positioning of the respective lens elements. For example, the lens element assembly can include a first lens element which can be adjustably positioned, in parallel with the beam pathway, to adjust a divergence of the beam in a fast axis of the beam and a second lens element which can be adjustably positioned, in parallel with the beam pathway, to adjust a divergence of the beam in a slow axis of the beam. In some embodiments, the lens element assembly includes one or more lens elements which can be adjustably positioned to adjust divergence of the beam in multiple cross sectional axes, including all cross sectional axes of the beam. In some embodiments, various lens elements in the lens element assembly can be adjustably positioned independently of each other. In some embodiments, the lens element assembly includes a light collimator which can at least partially collimate the light beam. Such a light collimator can be located on an "upstream" end of the lens element assembly, such that light received from the emitter device passes through the light collimator prior to passing through one or more of the lens elements which can adjust divergence in one or more cross sectional axes of the light beam.

At 610, a controller device is installed in the light beam scanning device. Such installation can include coupling the controller device to a structural frame of the light beam scanning device, electrically coupling the controller device to an electrical power source, etc. Such installation can include communicatively coupling the controller device to one or more other elements of the light beam scanning device, including one or more of the emitter device, scanner device, detector device, lens element assembly, some combination thereof, etc. The controller device can be included in one or more computer systems and can generate command signals to one or more of the emitter device, lens element assembly, scanner device, and detector to manage scanning of a light beam over at least a portion of the scan range of the light beam scanning device such that a field of view within the scan range can be mapped based on reflection points detected within the field of view.

Figure 7:
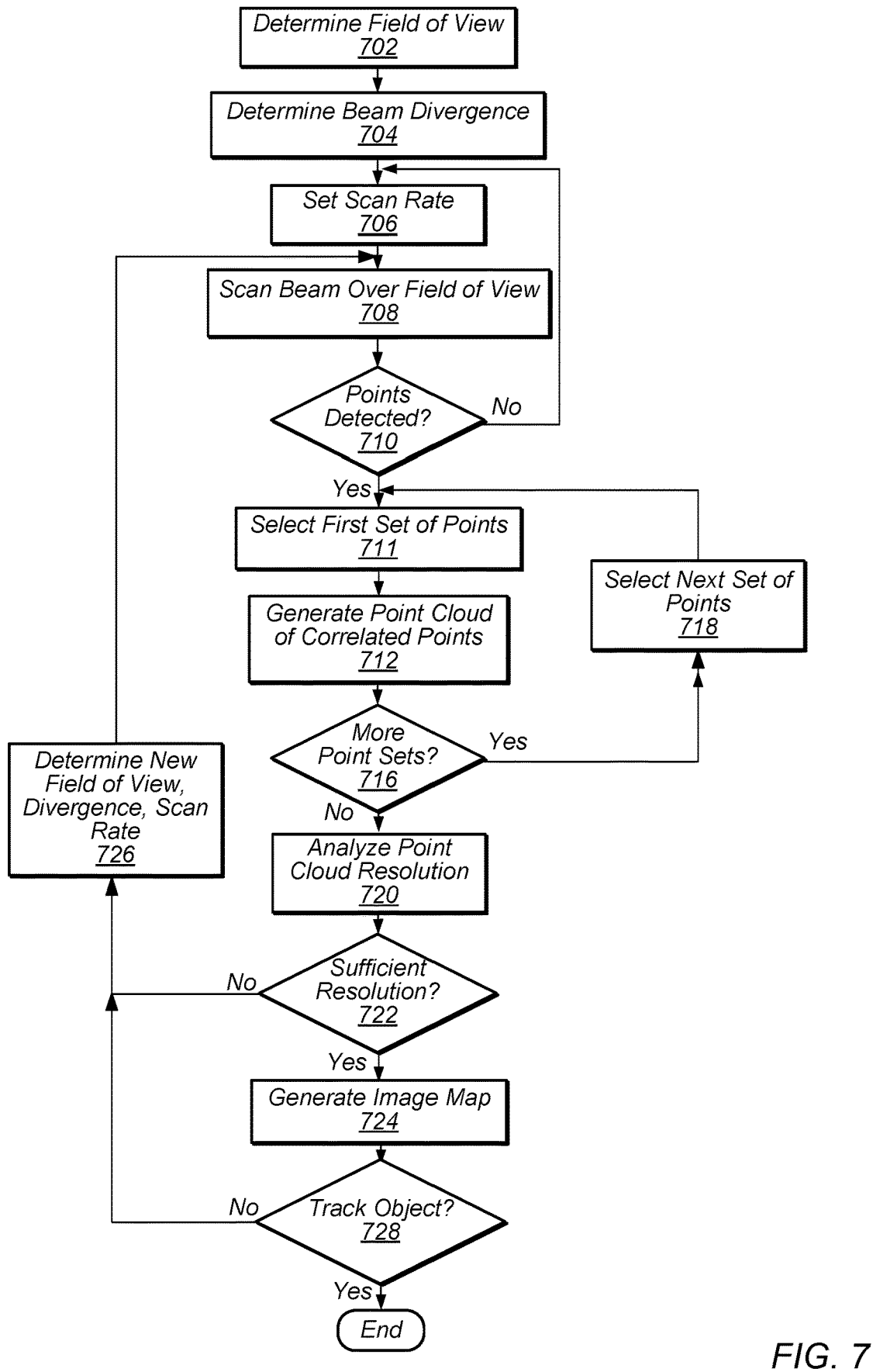
FIG. 7 illustrates dynamically adjusting a divergence of a light beam scanned, by a light beam scanning device, over a field of view that is within a scan range of the light beam scanning device, according to some embodiments.

FIG. 7 illustrates dynamically adjusting a divergence of a light beam scanned, by a scanner, over a field of view that is within a scan range of the scanner, according to some embodiments. Such dynamic adjustment can result in generation of a map of at least a portion of the scene located within the field of view, based at least in part upon a time of flight of the light beam to and from one or more points within the field of view. The dynamic adjustment can be implemented with regard to any of the above embodiments of the light beam scanning device by one or more controller devices. Such controller devices can be implemented by one or more computer systems.

At 702, a field of view within a scan range of the light beam scanning device is determined. The field of view can include the entirety of the scan range, a limited region of the scan range, etc. The field of view can be determined based on a default range of angles through the scan range and can indicate a range of directions through which the scanner device of the light beam scanning device can direct a light beam.

At 704, a divergence of the light beam is determined. The divergence, also referred to as "beam divergence", can be determined as an angular value associated with one or more cross sectional axes of the light beam. Separate divergences can be determined in associated with separate cross sectional axes. For example, one divergence can be determined for a fast axis of the beam and another divergence can be determined for another axis of the beam, including a slow axis. In some embodiments, a common divergence is determined for all cross sectional axes of the beam.

At 706, a scan rate of the scanner device is determined. The scan rate can be based at least in part upon the determined field of view, the determined beam divergence (s), some combination thereof, etc. The scan rate can be associated with an angular step change in direction, in the field of view, between separate directions into which the scanner directs consecutive light beam pulses, thereby being associated with an angular change of the scanner device between directing consecutive beam pulses into the field of view. In some embodiments, the scan rate indicates a rate at which the scanner device changes the direction of the directed light beam into the field of view. In some embodiments, the beam divergence is determined at 704 based at least in part upon the field of view and the scan rate.

At 708, a light beam is scanned through the determined field of view, based at least in part upon the determined beam divergence and scan rate. Such scanning can include controlling one or more elements of a lens element assembly to adjust beam divergence of one or more cross sectional axes of the beam, controlling the direction into which the scanner device directs the beam, etc. Such scanning can include implementing one or more consecutive "scans" of the field of view, wherein at least the scanner device is controllably adjusted within a time period to sweep the light beam through one or more regions of the field of view during the time period. Such scanning can follow a particular scan pattern, such that the light beam is swept through the particular scan pattern in the field of view within the time period. Where the light beam includes a sequence of beam pulses, the scanner device can be controllably adjusted to change orientation between consecutive sets of beam pulses, such that the various beam pulses are directed into different directions within the field of view according to the scan pattern. Directing a light beam, beam pulses, etc. into the field of view according to a scan pattern can result in an even distribution of the light beam through the field of view during the time period. One or more of the beam divergence and scan rate can be adjusted over time during a given scan of the determined field of view. For example, a scanning of the field of view can include a set of two consecutive and separate "scans" of the field of view according to a particular scan pattern, where the lens element assembly is controllably adjusted between consecutive scans to adjust the beam divergence, so that the separate consecutive scans include separate scans of the light beam over the field of view at separate beam divergences. In some embodiments, one or more of the beam divergence, scan rate, etc. can be adjusted based on detection of one or more reflection points at a detector device included in the light beam scanning device.

At 710, a determination is made regarding whether one or more reflection points are detected within the field of view, based at least in part upon an output from a detector device in the light beam scanning device. The output can include an indication that one or more reflection points are detected in the field of view and can include separate sets of information associated with each of the separate reflection points, including one or more of a determined depth, azimuth, and elevation of the point within the field of view. If not, the scanning of the field of view, at 708, can be repeated. If so, at 711, a first set of reflection points are identified and selected. A "set" of reflection points can be identified based on a correlation of the points, based on one or more similarities in associated properties of the various points, including one or more of similar depth, azimuth, elevation, intensity, etc. within the field of view. Such separate sets of points can be associated with separate objects located within a scene that is within the field of view. At 712, a point cloud of the selected set of points is generated At 716 and 718, if additional sets of reflection points are detected at 710, a next set of points is determined and process 712-714 is repeated relative to the next set. If not, at 720, the generated point clouds are analyzed to determine, at 722, whether the resolution of the point clouds meet a sufficient threshold. Such a threshold can be based at least in part upon the spot size of the reflection points, which can be based on the beam divergence determined at 704, a comparison of one or more point clouds with one or more predetermined objects in one or more predetermined shapes, etc. In some embodiments, a determination regarding whether a point cloud has sufficient resolution can be based at least in part upon user input, a determination of whether at least a portion of the object is not mapped in the generated point cloud, etc. In some embodiments, a determination regarding whether a point cloud has sufficient resolution can be based at least in part upon the signal to noise ratio of one or more of the reflection points correlated into the cloud. Such a signal to noise ratio can be determined based at least in part upon the intensity of the reflection point. For example, where the mapped object has a low reflectivity, reflection points detected as a result of a scan with a wide-divergence beam may have low intensity, such that the signal to noise ratio of the reflection points in a point cloud of the object is low. Based on such a determination of low signal to noise ratio, which can be a signal to noise ratio of one or more reflection points in the point cloud which is less than a threshold radio, a determination can be made that the resolution of the point cloud of the object is less than a threshold.

If, at 722, the resolution of the generated point clouds is determined to be sufficient with regard to one or more thresholds, an image map of one or more of the various objects is generated, at 724, based on the generated point clouds of the one or more objects. The image map can include an image of a scene that is located within the original field of view at 702, where the image includes images of various objects within the scene which are generated based on the generated point clouds of the respective objects. In some embodiments, the image map is a 3D map of one or more objects located within the original field of view 702, including a 3D map of some or all of a scene located within the original field of view. Based on the generating of the image map, one or more objects located within the image map can be identified and tracked over time.

If at 722 and 726, a determination is made that a resolution of one or more point clouds fails to meet one or more thresholds, one or more of the field of view, scan rate, and beam divergence are determined based on the selected set of reflection points. The field of view can be determined as a limited region of the field of view determined at 702, where the limited region encompasses the limited region of the original field of view in which the set of reflection points are located. The scan rate can be determined based at least in part upon a rate at which the light beam can be scanned through the new field of view, according to one or more scan patterns, within a given time period. The time period can be a set period of time which is equivalent to the time period in which a scan is implemented at 708, and can represent a maximum period of time in which a scan can be implemented. As such, in some embodiments, the new scan rate can be a minimum scan rate during which the new field of view can be scanned within the given time period, according to one or more scan patterns. The beam divergence can be determined based at least in part upon the field of view, scan rate, etc. In some embodiments, the beam divergence is determined based at least in part upon a determined depth of the selected set of reflection points within the field of view. In some embodiments, the beam divergence is determined such that the cross sectional area of the beam is adjusted according to a relationship between beam cross sectional area and one or more of the field of view size, scan rate, etc. For example, the beam divergence can be decreased according to decreases in the field of view, scan rate, etc., such that overlap between consecutive beam pulses directed into the new field of view is minimized. In some embodiments, beam divergence is adjusted based on a determination that the resolution of a point cloud of an object is less than a threshold due to a low signal to noise ratio of the reflection points in the cloud. Such adjustment of beam divergence can include narrowing the beam divergence, so that reflection points on the object can have a greater intensity, and thus higher signal to noise ratio, due to a smaller spot size of the beam reflecting off of the object. In some embodiments, one or more of the new divergence, field of view, and scan rate is the same as the previous divergence, field of view, scan rate, some combination thereof, etc. Upon the determination of the new scan rate, divergence, and field of view at 726, a new scan is implemented according to the determined scan rate, divergence, and field of view.

At 728, a determination is made whether to track one or more of the objects detected within the field of view. Such a determination can be made based at least in part upon identification of a detected object as being associated with a particular known object (e.g., a human face), receipt of particular user input commanding tracking of a particular detected object (e.g., a command to track a ball), etc. If so, at 726, a new field of view, divergence, and scan rate can be determined based on the location of the detected object within the field of view.

Example Computer System

Figure 8:
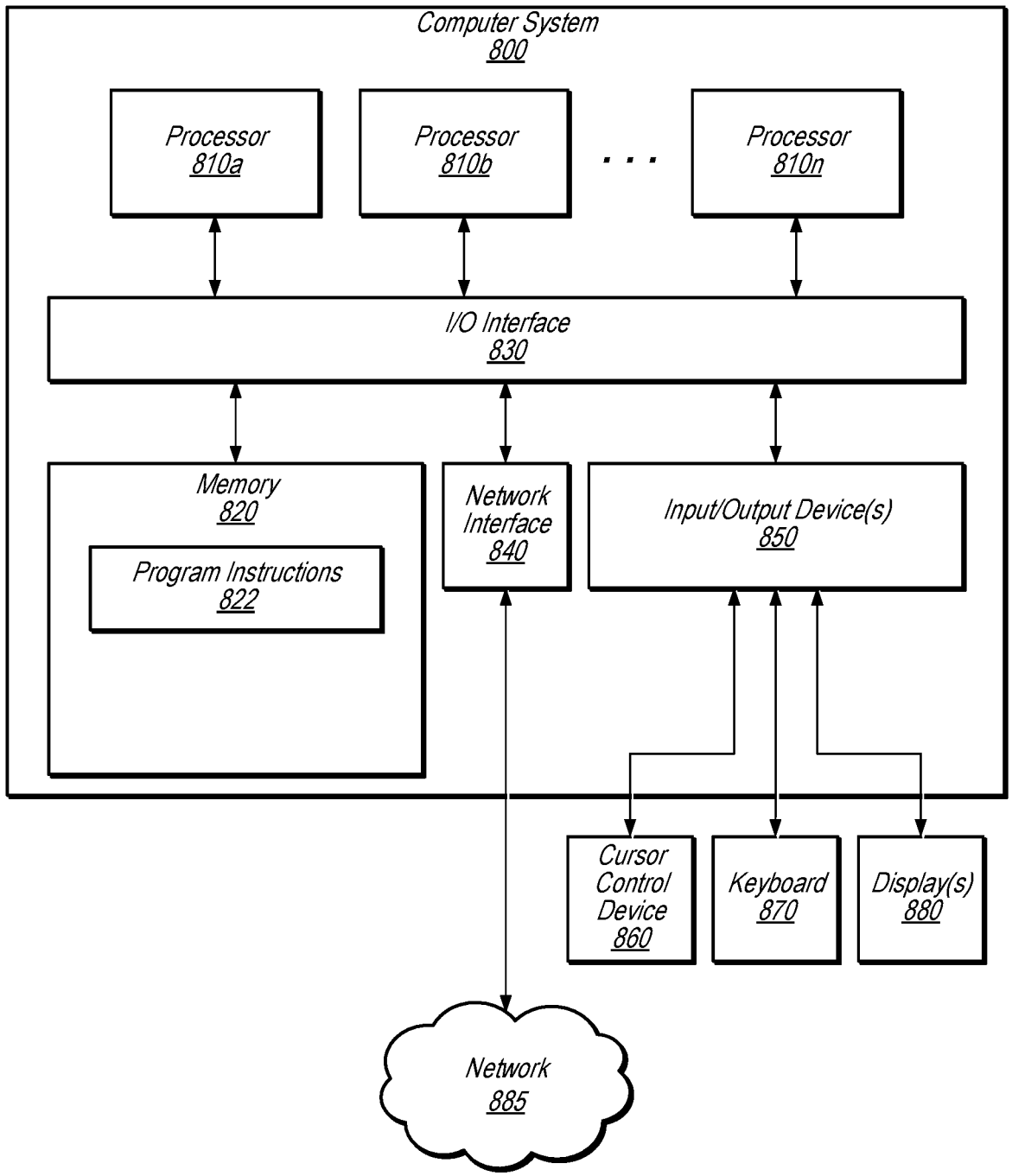
FIG. 8 illustrates an example computer system configured to implement aspects of a system and method for light beam scanning, according to some embodiments.

FIG. 8 illustrates an example computer system 800 that may be configured to include or execute any or all of the embodiments described above. In different embodiments, computer system 800 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a controller device, as described herein, may be executed in one or more computer systems 800, which may interact with various other devices. Note that any component, action, or functionality described above with respect to FIGS. 1 through 7 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store camera control program instructions 822 and/or camera control data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 may be configured to implement a beam divergence control incorporating any of the functionality described above. Additionally, control data of memory 820 may include any of the information or data structures described above. In some embodiments, program instructions and/or data may be received, sent or stored upon different types of computer-accessible media or on similar media separate from system memory 820 or computer system 800. While computer system 800 is described as implementing the functionality of functional blocks of previous Figures, any of the functionality described herein may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822, which may be processor-executable to implement any element or action described above. In one embodiment, the program instructions may implement the methods described above. In other embodiments, different elements and data may be included. Note that data may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a light beam scanning device configured to scan a light beam, over one or more fields of view at one or more scan rates and generate an image map of at least a portion of a scene within the one or more fields of view, based at least in part upon a time of flight of the light beam to and from one or more points within the scene, wherein the light beam scanning device comprises:
a controller device configured to control at least one portion of the light beam scanning device to dynamically adjust a beam spot size of the light beam as the light beam is scanned over at least a portion of at least one field of view during a scan over the at least one field of view within a scan range of the light beam scanning device.

2. The apparatus of claim 1, wherein:
the light beam scanning device comprises a plurality of lens elements located within a pathway of the light beam; and
to control at least one portion of the light beam scanning device to dynamically adjust a beam spot size of the light beam, the controller device is configured to translate of at least one lens element, in a direction parallel to a direction of the light beam, to a particular position associated with a particular beam spot size of the light beam.

3. The apparatus of claim 1, wherein:
to dynamically adjust a beam spot size of the light beam, the controller device is configured to dynamically adjust a beam spot diameter of the light beam along at least one axis of the beam spot, relative to a diameter of the beam spot along at least one other axis of the beam spot.

4. The apparatus of claim 1, wherein:
to dynamically adjust a beam spot size of the light beam, the controller device is configured to adjust the beam spot size of the light beam between separate scans of the light beam over at least a portion of a selected field of view, such that the beam spot size of the light beam is different between at least two consecutive scans.

5. The apparatus of claim 1, wherein the light beam scanning device is configured to scan the light beam over the one or more fields of view at least partly via a scanner having a plurality of selectable scan rates and configured to direct a reflected beam of light, that has been reflected from the one or more points within the scene, such that the reflected beam of light follows one or more paths towards a detector configured to detect light.

6. The apparatus of claim 1, wherein, to dynamically adjust a beam spot size of the light beam as the light beam is scanned over at least a portion of at least one field of view, the controller device is configured to:
initially scan the light beam over a first selected field of view of the scan range at a first scan rate and a first beam spot size; and
subsequently scan the light beam over a second field of view, encompassed within a limited region of the first field of view, at a second scan rate and a second beam spot size, based at least in part upon a determined time of flight of the light beam to and from at least one point located within the first field of view.

7. The apparatus of claim 6, wherein:
the second field of view comprises a limited region of the first field of view in which the at least one point is located; and the controller device is configured to identify the second field of view, and subsequently scan the light beam over a second field of view, based at least in part upon identification of the limited region in which the at least one point is located.

8. The apparatus of claim 6, wherein:
the light beam scanning device comprises a detector which is configured to receive the light reflected from at least a point within at least one field of view; and
to generate the image map of at least a portion of the scene, the controller device is configured to determine at least a depth, azimuth, and elevation of the at least one point located within the scan range, relative to at least a portion of the light beam scanning device, based at least in part upon the time of flight of the light beam to and from the at least one point, and an orientation of a scanner which scans the light beam over at least one field of view within the scan range.

9. The apparatus of claim 1, wherein:
the controller device is configured to dynamically adjust a beam spot size of the light beam based at least in part upon at least one of:
a selected beam spot size, of a set of predetermined beam spot sizes, or
a received command specifying a particular beam spot size.

10. A method, comprising:
performing, by at least one computer system:
dynamically adjusting a beam spot size of a light beam scanned, by a light beam scanning device, over a scene that is within a field of view of a scan range of the light beam scanning device, such that a map of at least a portion of the scene is generated, based at least in part upon a time of flight of the light beam to and from one or more points within the scene, wherein dynamically adjusting the beam spot size of the light beam comprises:
adjusting the beam spot size of the light beam during a scan over at least one field of view within the scan range.

11. The method of claim 10, wherein the dynamically adjusting comprises:
directing the beam of light to be scanned, by the light beam scanning device, over a first field of view at a first scan rate and at a first beam spot size; and
based at least in part upon a time of flight of the light beam to and from a particular portion of the scene within the first field of view, directing the beam of light to be scanned, by the light beam scanning device, over a second field of view at a second scan rate and at a second beam spot size, wherein the second field of view encompasses a limited region of the first field of view which includes the particular portion of the scene.

12. The method of claim 11, wherein directing the beam of light to be scanned over a second field of view at a second scan rate and at a second beam spot size comprises:
selecting the second scan rate and the second beam spot size based at least in part upon the time of flight of the light beam to and from the particular portion of the scene.

13. The method of claim 10, wherein dynamically adjusting the beam spot size of the light beam comprises adjusting a diameter of at least one axis of the beam spot, relative to a diameter of at least one other axis of the beam spot.

14. The method of claim 10, wherein dynamically adjusting the beam spot size of the light beam comprises:
adjusting the beam spot size of the light beam between separate scans of the light beam over at least one field of view within the scan range, such that the beam spot size of the light beam is different between at least two consecutive scans.

15. The method of claim 10, wherein the light beam is scanned over the one or more fields of view at least partly via a scanner having a plurality of selectable scan rates and configured to direct a reflected beam of light, that has been reflected from the one or more points within the scene, such that the reflected beam of light follows one or more paths towards a detector configured to detect light.

16. A non-transitory computer-readable storage medium storing a program of computer executable instructions that, when executed by a computer, cause the computer to perform:
dynamically adjusting a beam spot size of a light beam scanned, by a light beam scanning device, over a scene that is within a field of view of a scan range of the light beam scanning device, such that a map of at least a portion of the scene is generated, based at least in part upon a time of flight of the light beam to and from one or more points within the scene, wherein dynamically adjusting the beam spot size of the light beam comprises:
adjusting the beam spot size of the light beam during a scan over at least one field of view within the scan range.

17. The non-transitory computer-readable storage medium of claim 16, wherein the dynamically adjusting comprises:
directing the beam of light to be scanned, by the light beam scanning device, over a first field of view at a first scan rate and at a first beam spot size; and
based at least in part upon a time of flight of the light beam to and from a particular portion of the scene within the first field of view, directing the beam of light to be scanned, by the light beam scanning device, over a second field of view at a second scan rate and at a second beam spot size, wherein the second field of view encompasses a limited region of the first field of view which includes the particular portion of the scene.

18. The non-transitory computer-readable storage medium of claim 16, wherein directing the beam of light to be scanned, by the scanner, over a second field of view at a second scan rate and at a second beam spot size comprises:
selecting the second scan rate and the second beam spot size based at least in part upon the time of flight of the light beam to and from the particular portion of the scene.

19. The non-transitory computer-readable storage medium of claim 16, wherein dynamically adjusting the beam spot size of the light beam comprises:
adjusting the beam spot size of the light beam between separate scans of the light beam over at least one field of view within the scan range, such that the beam spot size of the light beam is different between at least two consecutive scans.

20. The non-transitory computer-readable storage medium of claim 16, wherein the light beam is scanned over the one or more fields of view at least partly via a scanner having a plurality of selectable scan rates and configured to direct a reflected beam of light, that has been reflected from the one or more points within the scene, such that the reflected beam of light follows one or more paths towards a detector configured to detect light.

* * * * *